US009152113B2

(12) United States Patent
Suzuki

(10) Patent No.: US 9,152,113 B2
(45) Date of Patent: Oct. 6, 2015

(54) IMAGE FORMING APPARATUS OF DISPLAYING A RELATIONSHIP OF SCREENS FOR VISUALIZING SCREEN TRANSITION, INFORMATION PROCESSING SYSTEM, INFORMATION PROCESSING METHOD AND RECORDING MEDIUM

(75) Inventor: Tomohiro Suzuki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 245 days.

(21) Appl. No.: 13/309,930

(22) Filed: Dec. 2, 2011

(65) Prior Publication Data

US 2012/0147405 A1 Jun. 14, 2012

(30) Foreign Application Priority Data

Dec. 13, 2010 (JP) ................................. 2010-276811

(51) Int. Cl.
*G06K 15/02* (2006.01)
*G03G 15/00* (2006.01)

(52) U.S. Cl.
CPC .................................... *G03G 15/502* (2013.01)

(58) Field of Classification Search
None
See application file for complete search history.

(56) References Cited

U.S. PATENT DOCUMENTS

| | | | | |
|---|---|---|---|---|
| 2005/0289450 | A1* | 12/2005 | Bent et al. | 715/506 |
| 2009/0055764 | A1* | 2/2009 | Katsumata | 715/764 |
| 2009/0064002 | A1* | 3/2009 | Katsumata et al. | 715/762 |
| 2009/0129739 | A1* | 5/2009 | Kato et al. | 386/52 |
| 2009/0276699 | A1 | 11/2009 | Hatakeyama | |
| 2010/0325541 | A1* | 12/2010 | Imaizumi et al. | 715/708 |
| 2011/0035688 | A1* | 2/2011 | Kinoshita et al. | 715/763 |

FOREIGN PATENT DOCUMENTS

| | | |
|---|---|---|
| JP | 2002-182914 | 6/2002 |
| JP | 2009-048397 | 3/2009 |
| JP | 2009-271681 | 11/2009 |

* cited by examiner

*Primary Examiner* — Ming Hon
*Assistant Examiner* — Andrew H Lam
(74) *Attorney, Agent, or Firm* — IPUSA, PLLC

(57) ABSTRACT

An image forming apparatus including a first memory unit configured to store screen transition information in which a screen transition of applications is described in a hierarchical structure; a second memory unit configured to store conditional information in which UIs for previous screens and posterior screens are associated for each screen; a display unit configured to display the screen transition in the hierarchical form based on the screen transition information; and a customization control unit configured to control customization based on the conditional information corresponding to a screen to be customized and update the screen transition information when the screen transition displayed in the display unit is customized.

8 Claims, 38 Drawing Sheets

FIG.5

| SCREEN | PRECONDITION FOR SCREEN ITEM | PRECONDITION FOR INFORMATION | POSTCONDITION FOR SCREEN ITEM | POSTCONDITION FOR INFORMATION |
|---|---|---|---|---|
| ALL DESTINATION DISPLAY SCREEN | NON | NON | NON | NON |
| PASSWORD SCREEN | NON | NON | NON | PASSWORD IS INPUT |
| ELECTRONIC DOCUMENT SELECTING SCREEN | ELECTRONIC DOCUMENT SELECTING BUTTON | NON | REFERENCE BUTTON = REFERENCE SOURCE DESIGNATING SCREEN | NON |
| | | | SEARCH BUTTON = SEARCH SCREEN | NON |
| | | | DETAILED DOCUMENT DISPLAY BUTTON = DETAILED DOCUMENT DISPLAY SCREEN | NON |
| DESTINATION ARCHIVE SCREEN | DESTINATION ARCHIVE BUTTON | NON | NON | NON |
| REFERENCE SOURCE DESIGNATING SCREEN | REFERENCE BUTTON | NON | NON | NON |
| DETAILED DOCUMENT DISPLAY SCREEN | DETAILED DOCUMENT DISPLAY BUTTON | NON | NON | NON |
| SCANNER OR FACSIMILE TOP SCREEN | NON | NON | NON | NON |
| ORIGINAL READING DIALOGUE | NON | NON | NON | NON |
| PREVIEW SCREEN | PREVIEW BUTTON | NON | NON | NON |
| SETUP CONFIRMATION AND PREVIEW SCREEN | SETUP CONFIRMATION AND PREVIEW BUTTON | NON | NON | NON |
| . . . | . . . | . . . | . . . | . . . |

FIG.6

SCREEN TRANSITION INFORMATION.xml

```
<?xml version="1.0" encoding="UTF-8" ?>
<component name="FAX・スキャナー" displayset="XXXXX_NORMAL" displayname="" vendor="Common-LCD_CUS0007" version="0.01" setname="Common-LCD_CUS0003" description="Common-LCD_CUS0005">
  <!--このコンポーネントが保有する画面の階層構造一覧を定義します-->
  <category type="layout" path="/resource/faxscannerui">
    <!--FAXスキャナーTOP画面 START -->
    <layout name="FAX・スキャナー" resource="faxscannerTop" filetype="SWF" displayname="" description="" >～a1
            <layout name="原稿読み取りダイアログ" resource="readingstartdialog" filetype="SWF" displayname="" description="" >～a11
            <layout/>
            <layout name="SETUP CONFIRMATION/プレビュー" resource="settingpreview" filetype="SWF" displayname="" description="" >～a12
                  <layout name="原稿読み取りダイアログ" resource="readingstartdialog" filetype="SWF" displayname="" description="" >～a121
                     <layout/>
                  <layout name="プレビュー" resource="preview " filetype="SWF" displayname="" description="" >～a122
                     <layout/>
            <layout/>
            <layout name="電子文書選択" resource="electronicpaperselect" filetype="SWF" displayname="" description="" >～a13
                        <layout name="参照先指定" resource="referenceselect" filetype="SWF" displayname="" description="" >～a131
                        <layout/>
                        <layout name="文書検索" resource="documentsearch" filetype="SWF" displayname="" description="" >～a132
                        <layout/>
                        <layout name="文書詳細" resource="documentdetail" filetype="SWF" displayname="" description="" >～a133
                        <layout/>
            <layout/>
    <layout/>
  </category>
</component>
```

FIG.10

| PREVIOUS SCREEN | ADDITIONAL SCREEN | POSTERIOR SCREEN |
|---|---|---|
| SCANNER OR FACSIMILE TOP SCREEN | ALL DESTINATION DISPLAY SCREEN | ORIGINAL READING DIALOGUE |

FIG.11

| SCREEN | PRECONDITION FOR SCREEN ITEM | PRECONDITION FOR INFORMATION | POSTCONDITION FOR SCREEN ITEM | POSTCONDITION FOR INFORMATION |
|---|---|---|---|---|
| ALL DESTINATION DISPLAY SCREEN | NON | NON | NON | NON |

FIG.12

SCREEN TRANSITION INFORMATION.xml

```
<?xml version="1.0" encoding="UTF-8" ?>
<component name="FAX・スキャナー" displayset="XXXXX_NORMAL" displayname="" vendor="Common-LCD_CUS0007" version="0.01" setname="Common-LCD_CUS0003" description="Common-
LCD_CUS0005">
  <!--このコンポーネントが保有する画面の階層構造一覧を定義します-->
  <category type="layout" path="/resource/faxscannerui">
    <!--FAXスキャナーTOP画面 START -->
    <layout name="FAX・スキャナー" resource="faxscannerTop" filetype="SWF" displayname="" description="" >
          <layout name=" 全宛先表示" resource="alladdressdisplay " filetype="SWF" displayname="" description="" >
  a21           <layout name="原稿読み取りダイアログ" resource="readingstartdialog" filetype="SWF" displayname="" description="" >
                <layout/>
          <layout/>
          <layout name="SETUP CONFIRMATION/プレビュー" resource="settingpreview" filetype="SWF" displayname="" description="" >
                          <layout name="原稿読み取りダイアログ" resource="readingstartdialog" filetype="SWF" displayname="" description="" >
                              <layout/>
                          <layout name="プレビュー" resource="preview " filetype="SWF" displayname="" description="" >
                              <layout/>
          <layout/>
          <layout name="電子文書選択" resource="electronicpaperselect" filetype="SWF" displayname="" description="" >
                                        <layout name="参照先指定" resource="referenceselect" filetype="SWF" displayname="" description="" >
                                        <layout/>
                                        <layout name="文書検索" resource="documentsearch" filetype="SWF" displayname="" description="" >
                                        <layout/>
                                        <layout name="文書詳細" resource="documentdetail" filetype="SWF" displayname="" description="" >
                                        <layout/>
            <layout/>
<layout/>
  </category>
</component>
```

FIG.14

| PREVIOUS SCREEN | ADDITIONAL SCREEN | POSTERIOR SCREEN |
| --- | --- | --- |
| PREVIEW SCREEN | DESTINATION ARCHIVE SCREEN | NON |

FIG.15

| SCREEN | PRECONDITION FOR SCREEN ITEM | PRECONDITION FOR INFORMATION | POSTCONDITION FOR SCREEN ITEM | POSTCONDITION FOR INFORMATION |
| --- | --- | --- | --- | --- |
| DESTINATION ARCHIVE SCREEN | DESTINATION ARCHIVE BUTTON | NON | NON | NON |

FIG.20

SCREEN TRANSITION INFORMATION.xml

```
<?xml version="1.0" encoding="UTF-8" ?>
<component name="FAX・スキャナー" displayset="XXXXX_NORMAL" displayname="" vendor="Common-LCD_CUS0007" version="0.01" setname="Common-LCD_CUS0003" description="Common-LCD_CUS0005">
  <!--このコンポーネントが保有する画面の階層構造一覧を定義します-->
  <category type="layout" path="/resource/faxscannerui">
    <!--FAXスキャナーTOP画面 START -->
    <layout name="FAX・スキャナー" resource="faxscannerTop" filetype="SWF" displayname="" description="" >
          <layout name=" 全宛先表示" resource="alladdressdisplay " filetype="SWF" displayname="" description="" >
          <layout/>
          <layout name="SETUP CONFIRMATION/プレビュー" resource="settingpreview" filetype="SWF" displayname="" description="" >
                 <layout name="原稿読み取りダイアログ" resource="readingstartdialog" filetype="SWF" displayname="" description="" >
                    <layout/>
                 <layout name="プレビュー" resource="preview " filetype="SWF" displayname="" description="" >
           a31 {  <layout name="宛先参照" resource="addressreference " filetype="SWF" displayname="" description="" >
                  <layout/>
                    <layout/>
            <layout/>
          <layout name="電子文書選択" resource="electronicpaperselect" filetype="SWF" displayname="" description="" >
                           <layout name="参照先指定" resource="referenceselect" filetype="SWF" displayname="" description="" >
                           <layout/>
                           <layout name="文書検索" resource="documentsearch" filetype="SWF" displayname="" description="" >
                           <layout/>
                           <layout name="文書詳細" resource="documentdetail" filetype="SWF" displayname="" description="" >
                           <layout/>
            <layout/>
<layout/>
  </category>
</component>
```

FIG.22

| PREVIOUS SCREEN | ADDITIONAL SCREEN | POSTERIOR SCREEN |
|---|---|---|
| SETUP CONFIRMATION AND PREVIEW SCREEN | ELECTRONIC DOCUMENT SELECTING SCREEN | NON |

FIG.23

| SCREEN | PRECONDITION FOR SCREEN ITEM | PRECONDITION OFOR INFORMATION | POSTCONDITION FOR SCREEN ITEM | POSTCONDITION FOR INFORMATION |
|---|---|---|---|---|
| ELECTRONIC DOCUMENT SELECTING SCREEN | ELECTRONIC DOCUMENT SELECTING BUTTON | NON | REFERENCE BUTTON = REFERENCE SOURCE DESIGNATING SCREEN | NON |
| | | | SEARCH BUTTON = SEARCH SCREEN | NON |
| | | | DETAILED DOCUMENT DISPLAY BUTTON = DETAILED DOCUMENT DISPLAY SCREEN | NON |

FIG.27

SCREEN TRANSITION INFORMATION.xml

```
<?xml version="1.0" encoding="UTF-8" ?>
<component name="FAX・スキャナー" displayset="XXXXX_NORMAL" displayname="" vendor="Common-LCD_CUS0007" version="0.01" setname="Common-LCD_CUS0003" description="Common-LCD_CUS0005">
  <!--このコンポーネントが保有する画面の階層構造一覧を定義します-->
  <category type="layout" path="/resource/faxscannerui">
    <!--FAXスキャナーTOP画面 START -->
    <layout name="FAX・スキャナー" resource="faxscannerTop" filetype="SWF" displayname="" description="" >
          <layout name=" 全宛先表示" resource="alladdressdisplay " filetype="SWF" displayname="" description="" >
          <layout/>
          <layout name="SETUP CONFIRMATION/プレビュー" resource="settingpreview" filetype="SWF" displayname="" description="" >
                <layout name="原稿読み取りダイアログ" resource="readingstartdialog" filetype="SWF" displayname="" description="" >
                    <layout/>
                <layout name="プレビュー" resource="preview " filetype="SWF" displayname="" description="" >
                    <layout/>
      a41 ⎧     <layout name="電子文書選択" resource="electronicpaperselect" filetype="SWF" displayname="" description="" >
          ⎪                   <layout name="参照先指定" resource="referenceselect" filetype="SWF" displayname="" description="" >
          ⎪                   <layout/>
          ⎪                   <layout name="文書検索" resource="documentsearch" filetype="SWF" displayname="" description="" >
          ⎪                   <layout/>
          ⎪                   <layout name="文書詳細" resource="documentdetail" filetype="SWF" displayname="" description="" >
          ⎪                   <layout/>
          ⎩     <layout/>
            <layout/>
          <layout name="電子文書選択" resource="electronicpaperselect" filetype="SWF" displayname="" description="" >
                              <layout name="参照先指定" resource="referenceselect" filetype="SWF" displayname="" description="" >
                              <layout/>
                              <layout name="文書検索" resource="documentsearch" filetype="SWF" displayname="" description="" >
                              <layout/>
                              <layout name="文書詳細" resource="documentdetail" filetype="SWF" displayname="" description="" >
                              <layout/>
            <layout/>
<layout/>
  </category>
</component>
```

FIG.29

| PREVIOUS SCREEN | ADDITIONAL SCREEN | POSTERIOR SCREEN |
|---|---|---|
| SCANNER/FACSIMILE TOP SCREEN | ELECTRONIC DOCUMENT SELECTING SCREEN | DESTINATION DESIGNATING SCREEN |
| | | DOCUMENT SEARCH SCREEN |
| | | DETAILED DOCUMENT SCREEN |

FIG.30

| SCREEN | PRECONDITION FOR SCREEN ITEM | PRECONDITION FOR INFORMATION | POSTCONDITION FOR SCREEN ITEM | POSTCONDITION FOR INFORMATION |
|---|---|---|---|---|
| ELECTRONIC DOCUMENT SELECTING SCREEN | ELECTRONIC DOCUMENT SELECTING BUTTON | NON | REFERENCE BUTTON = REFERENCE SOURCE DESIGNATING SCREEN | NON |
| | | | SEARCH BUTTON = SEARCH SCREEN | NON |
| | | | DETAILED DOCUMENT DISPLAY BUTTON = DETAILED DOCUMENT DISPLAY SCREEN | NON |

FIG.33

SCREEN TRANSITION INFORMATION.xml

```xml
<?xml version="1.0" encoding="UTF-8" ?>
<component name="FAX・スキャナー" displayset="XXXXX_NORMAL" displayname="" vendor="Common-LCD_CUS0007" version="0.01" setname="Common-LCD_CUS0003" description="Common-LCD_CUS0005">
  <!--このコンポーネントが保有する画面の階層構造一覧を定義します-->
  <category type="layout" path="/resource/faxscannerui">
    <!--FAXスキャナーTOP画面 START -->
    <layout name="FAX・スキャナー" resource="faxscannerTop" filetype="SWF" displayname="" description="" >
          <layout name=" 全宛先表示" resource="alladdressdisplay " filetype="SWF" displayname="" description="" >
          <layout/>
          <layout name="SETUP CONFIRMATION/プレビュー" resource="settingpreview" filetype="SWF" displayname="" description="" >
                <layout name="原稿読み取りダイアログ" resource="readingstartdialog" filetype="SWF" displayname="" description="" >
                    <layout/>
                <layout name="プレビュー" resource="preview " filetype="SWF" displayname="" description="" >
                    <layout/>
          <layout/>
<layout/>
  </category>
</component>
```

FIG.35

| SCREEN | PRECONDITION FOR SCREEN ITEM | PRECONDITION FOR INFORMATION | POSTCONDITION FOR SCREEN ITEM | POSTCONDITION FOR INFORMATION |
|---|---|---|---|---|
| ELECTRONIC DOCUMENT SELECTING SCREEN | ELECTRONIC DOCUMENT SELECTING BUTTON | NON | REFERENCE BUTTON = REFERENCE SOURCE DESIGNATING SCREEN | NON |
| | | | SEARCH BUTTON = SEARCH SCREEN | NON |
| | | | DETAILED DOCUMENT DISPLAY BUTTON = DETAILED DOCUMENT DISPLAY SCREEN | NON |
| DESTINATION ARCHIVE SCREEN | DESTINATION ARCHIVE BUTTON | NON | NON | NON |
| REFERENCE SOURCE DESIGNATING SCREEN | REFERENCE BUTTON | NON | NON | NON |
| DETAILED DOCUMENT DISPLAY SCREEN | DETAILED DOCUMENT DISPLAY BUTTON | NON | NON | NON |

FIG.39

SCREEN TRANSITION INFORMATION.xml

```
<?xml version="1.0" encoding="UTF-8" ?>
<component name="FAX・スキャナー" displayset="XXXXX_NORMAL" displayname="" vendor="Common-LCD_CUS0007" version="0.01" setname="Common-LCD_CUS0003" description="Common-LCD_CUS0005">
  <!--このコンポーネントが保有する画面の階層構造一覧を定義します-->
  <category type="layout" path="/resource/faxscannerui">
    <!--FAXスキャナーTOP画面 START -->～a1
    <layout name="FAX・スキャナー" resource="faxscannerTop" filetype="SWF" displayname="" description="" >
            <layout name=" 全宛先表示" resource="alladdressdisplay " filetype="SWF" displayname="" description="" >
            <layout/>
            <layout name="SETUP CONFIRMATION/プレビュー" resource="settingpreview" filetype="SWF" displayname="" description="" >
                  <layout name="原稿読み取りダイアログ" resource="readingstartdialog" filetype="SWF" displayname="" description="" >
                     <layout/>
                  <layout name="プレビュー" resource="preview " filetype="SWF" displayname="" description="" >
                     <layout/>
            <layout name="参照先指定" resource="referenceselect" filetype="SWF" displayname="" description="" >～a131
            <layout/>
            <layout name="文書検索" resource="documentsearch" filetype="SWF" displayname="" description="" >～a132
            <layout/>
            <layout name="文書詳細" resource="documentdetail" filetype="SWF" displayname="" description="" >～a133
            <layout/>
    <layout/>
  </category>
</component>
```

IMAGE FORMING APPARATUS OF DISPLAYING A RELATIONSHIP OF SCREENS FOR VISUALIZING SCREEN TRANSITION, INFORMATION PROCESSING SYSTEM, INFORMATION PROCESSING METHOD AND RECORDING MEDIUM

BACKGROUND OF THE INVENTION

1. Field of the Invention

The present invention relates to an image forming apparatus, an information processing system, an information processing method and a recording medium.

2. Description of the Related Art

When a user purchases an image forming apparatus (MFP: Multifunction Peripheral), individual solutions may be simultaneously provided with the image forming apparatus so that the user can use the image forming apparatus under an environment suitable for the user. Solutions to be provided to users may be determined by preliminary discussions between the users and system engineers (SE).

Customization of user interfaces (UI) may be assumed to be changed by the system engineers (SE) in conformity with user environments. For example, if it is prohibited to send an e-mail and it is permitted to arrange scanned data in a folder, there is provided customization with which a button for sending the e-mail is not displayed.

The customization of UIs of image forming apparatuses of the same types which are simultaneously introduced may have been specially dealt with. In presently available apparatuses, there is a need for a user customizing the UI. For example, Patent Documents 1 and 2 disclose panel customizing methods for the image forming apparatuses.

On the other hand, there may be various types in the customization. For example, when screen transition is customized, there is a probability that, if a screen transition is customized, screens prior to and following the customized screen are affected by the customization. Therefore, the customization is not easy for the user. Therefore, if known techniques of the customization are applied, SEs and so on ordinarily realize requested customization of the screen transitions. Said differently, there is a problem that the user may not arbitrarily customize the screen transition and the like which are difficult to customize.

For example, a technique related to a document using a hierarchical structure is described in Patent Document 3. However, the technique is not easily applicable to the customization of the screen transition. For example, if the hierarchical structure is applied to the customization of the screen transition, the screen to be added or deleted affects screens displayed prior to and following the screen to be added or deleted. Therefore, it is not possible to simply add or delete the screen.

Patent Document 1: Japanese Laid-Open Patent Application No. 2009-48397

Patent Document 2: Japanese Laid-Open Patent Application No. 2002-182914

Patent Document 3: Japanese Laid-Open Patent Application No. 2009-271681

SUMMARY OF THE INVENTION

Accordingly, embodiments of the present invention may provide a novel and useful image forming apparatus, an information processing system, an information processing method and a recording medium, which enable a user to freely customize screen transition of a hierarchical structure, solving one or more of the problems discussed above.

One aspect of the embodiments of the present invention may be to provide an image forming apparatus including a first memory unit configured to store screen transition information in which a screen transition of applications is described in a hierarchical structure; a second memory unit configured to store conditional information in which UIs for previous screens and posterior screens are associated for each screen; a display unit configured to display the screen transition in the hierarchical form based on the screen transition information; and a customization control unit configured to control customization based on the conditional information corresponding to a screen to be customized and update the screen transition information when the screen transition displayed in the display unit is customized.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 5 illustrates an example of conditional information of the embodiment.

FIG. 6 illustrates an example of screen transition information.

FIG. 10 illustrates an example of first additional screen information.

FIG. 11 illustrates an example of first preconditions and postconditions of the additional screen information.

FIG. 12 illustrates an example of first updated screen transition information.

FIG. 14 illustrates an example of second additional screen information.

FIG. 15 illustrates an example of second preconditions and postconditions of the additional screen information.

FIG. 20 illustrates an example of updated second screen transition information.

FIG. 22 illustrates an example of third additional screen information.

FIG. 23 illustrates an example of third preconditions and postconditions of the additional screen information.

FIG. 27 illustrates an example of updated third screen transition information.

FIG. 29 illustrates an example of deletion screen information.

FIG. 30 illustrates an example of preconditions and postconditions of the deletion screen information.

FIG. 33 illustrates an example of updated fourth screen transition information.

FIG. 35 illustrates examples of preconditions and postconditions of the deletion screen and a screen of the postconditions.

FIG. 39 illustrates an example of updated fifth screen transition information.

DETAILED DESCRIPTION OF THE PREFERRED EMBODIMENTS

A description is given below, with reference to the FIG. 1 through FIG. 40 of embodiments of the present invention.

REFERENCE SYMBOLS TYPICALLY DESIGNATE AS FOLLOWS

1: information processing apparatus;
2: server;
5: MFP;
11, 51: control unit;
12, 52: main memory unit;
13, 53: auxiliary memory unit;
14, 54: external memory apparatus I/F unit;
15, 55: network I/F unit;
16: input unit;

17, 57: display unit;
56: operations unit;
58: engine unit;
101, 201: communication unit;
102, 202: sending unit;
103, 203: receiving unit;
104, 204: customization control unit;
105: memory unit;
106, 206: display screen control unit;
107, 207: operations input unit; and
108, 208: display unit.

Embodiment

<System>

Figure 1:
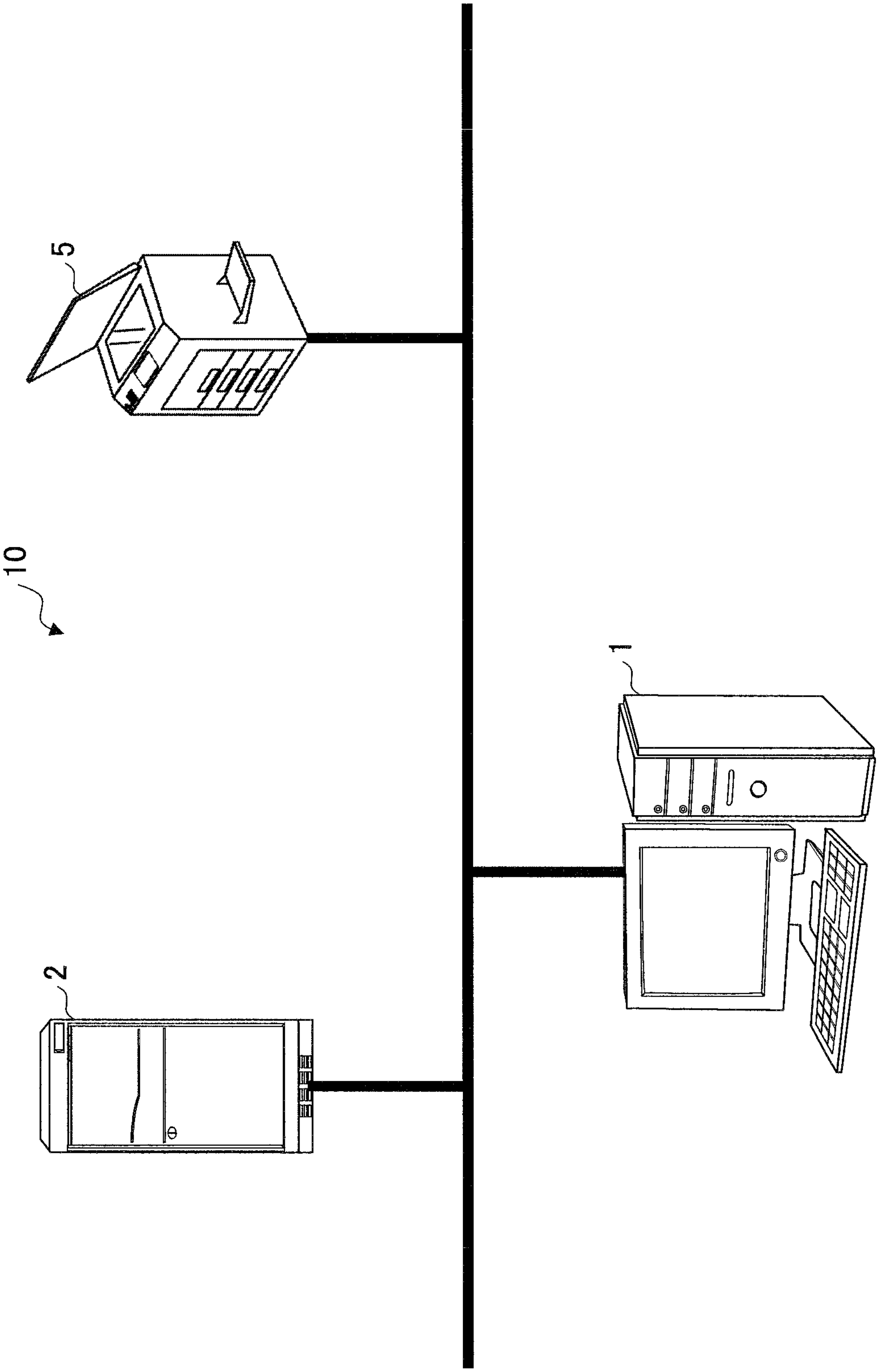
FIG. 1 illustrates an example of a customizing system of an embodiment.

FIG. 1 illustrates an example of a customizing system 10 of the embodiment. Referring to FIG. 1, a multifunction peripheral (MFP) 5, an information processing apparatus 1, a server 2, and so on are connected via a network in a customizing system 10. The numbers of the apparatuses, devices and so on to be connected are not limited to those illustrated in FIG. 1. Hereinafter, an example where the MFP 5 has a user interface (UI) screen customized is described. It is possible for the information processing apparatus 1 to customize using a customizing tool and apply the customization to the MFP 5.

<Hardware>

Figure 2:
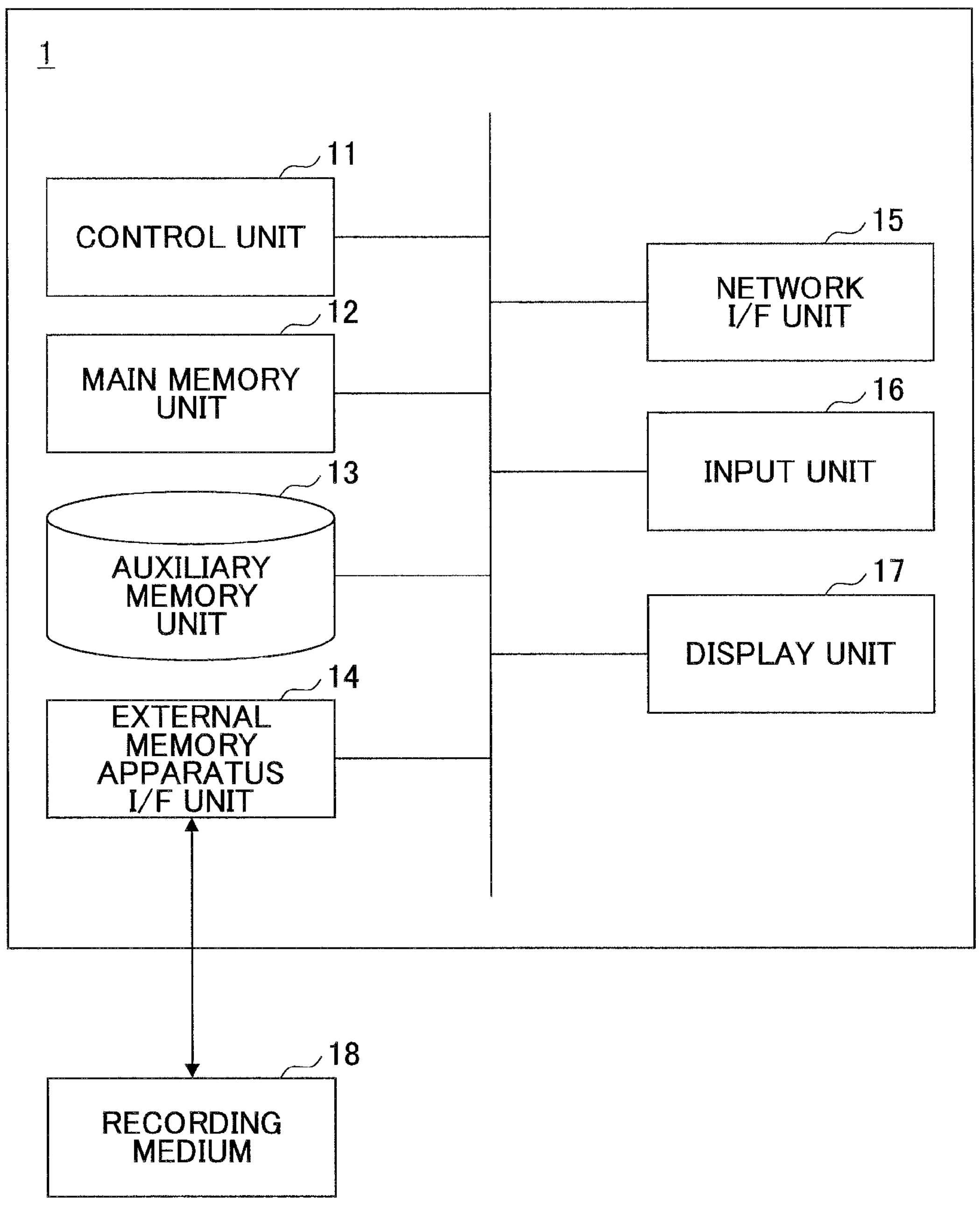
FIG. 2 is a block chart illustrating an example of hardware of the information processing apparatus of the embodiment.

Next, hardware of the information processing apparatus 1 of the embodiment is described. FIG. 2 is a block chart illustrating an example of the hardware of the information processing apparatus 1 of the embodiment. Referring to FIG. 2, the information processing apparatus 1 includes a control unit 11, a main memory unit 12, an auxiliary memory unit 13, an external memory apparatus I/F unit 14, a network I/F unit 15, an input unit 16 and the display unit 17. These components are mutually connected so as to be able to send and receive information via a bus.

The control unit 11 is a CPU carrying out controls of various units and portions, and operation and processing of data in a computer. The control unit 11 is an arithmetic device which executes programs stored in the main memory unit 12, receives data from an input device or a memory device, provides arithmetic computation and processing, and outputs to an output device or the memory device.

The main memory unit 12 may be a Read Only Memory (ROM) or a Random Access Memory (RAM), and constantly or temporarily stores programs and data, processed by the control unit 11, such as an Operating System (OS) being basic software or application software.

The auxiliary memory unit 13 may be a HDD and stores data related to the application software or the like.

The external memory apparatus I/F unit 14 is an interface between a recording medium 18 such as a flash memory and the information processing apparatus 1 via a data communication line such as a universal serial bus (USB).

A predetermined program is stored in the recording medium 18. The predetermined program stored in the recording medium 18 is installed in the information processing apparatus 1 via the external memory apparatus I/F unit 14, and the installed program can be executed by the information processing apparatus 1.

The network I/F unit 15 is an interface between the information processing apparatus 1 and peripheral apparatuses which have a communication function and is connected to a network such as a Local Area Network (LAN) and a Wide Area Network (WAN) formed with wired or wireless data transmission paths.

The input unit 16 includes a keyboard having a cursor key, a numeric keypad, various function keys and so on, and a mouse, a slice pad and so on for enabling to select the keys on a display screen of the display unit 17. The input unit 16 is a user interface through which the user can provide an operational instruction to the control unit 11 and input data.

The display unit 16 is made of a CRT, a LCD or the like and displays images in response to display data input from the control unit 11. The display unit 17 may be separate from the information processing apparatus 1. The information processing apparatus 1 has a display control function of displaying on the display unit 17. The server 2 has a hardware structure similar to the information processing apparatus 1.

Figure 3:
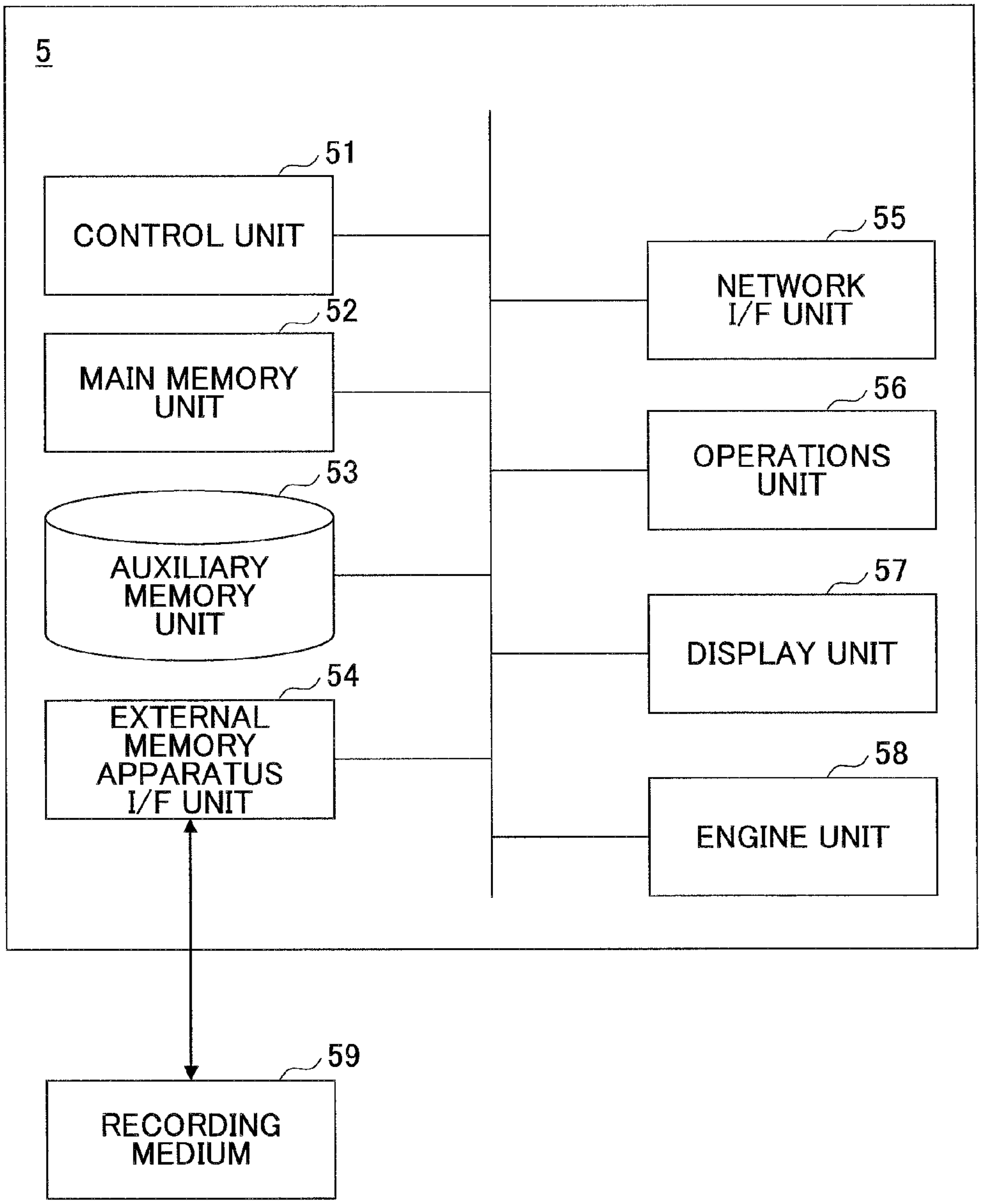
FIG. 3 is a block chart illustrating a MFP of the embodiment.

The hardware of the MFP 5 of the embodiment is described. FIG. 3 illustrates an example block chart of the MFP 5 of the embodiment. As illustrated in FIG. 3, the MFP 5 includes a control unit 51, a main memory unit 52, an auxiliary memory unit 53, an external memory device I/F unit 54, a network I/F unit 55, an operations unit 56, a display unit 57, and an engine unit 58. These components are mutually connected so as to be sent and received via a bus.

The control unit 51 is a CPU carrying out controls of various units and portions, and operation and processing of data in the computer. The control unit 51 is an arithmetic device which executes programs stored in the main memory unit 52 or the auxiliary memory unit 53, receives data from an input device or a memory device, provides arithmetic computation and processing, and outputs to the output device or the memory device.

The main memory unit 52 may be a Read Only Memory (ROM), a Random Access Memory (RAM) or the like, and constantly or temporarily store programs and data, processed by the control unit 51, such as an Operating System (OS) being basic software or application software.

The auxiliary memory unit 53 may be a Hard Disk Drive (HDD) and stores data related to the application software or the like.

The external memory device I/F unit 54 is an interface between the recording medium 59 such as a flash memory and an SD card and the MFP 5 connected via the data communication line such as a universal serial bus (USB).

A predetermined program is stored in the recording medium 59. The program stored in the recording medium 59 is installed in the MFP 5 via the external memory apparatus I/F unit 54, and the installed program can be executed by the MFP 5. The network I/F unit 55 is an interface between the MFP 5 and peripheral apparatuses which have communication functions and are connected to a network such as a Local Area Network (LAN) and a Wide Area Network (WAN) formed with wired or wireless data transmission paths.

The operations unit 56 and the display unit 57 may be made of a key switch (hardware keys) and a Liquid Crystal Display (LCD) having a touch panel including software keys of a Graphical User Interface (GUI). The operations unit 56 and the display unit 57 are User Interfaces (UI) for utilizing the functions of the MFP 5.

The engine unit 58 reads an original (a paper manuscript) and prints on a transfer paper as an input and output unit of the image data. The engine unit 58 may further include a scanner engine.

<Function>

Figure 4:
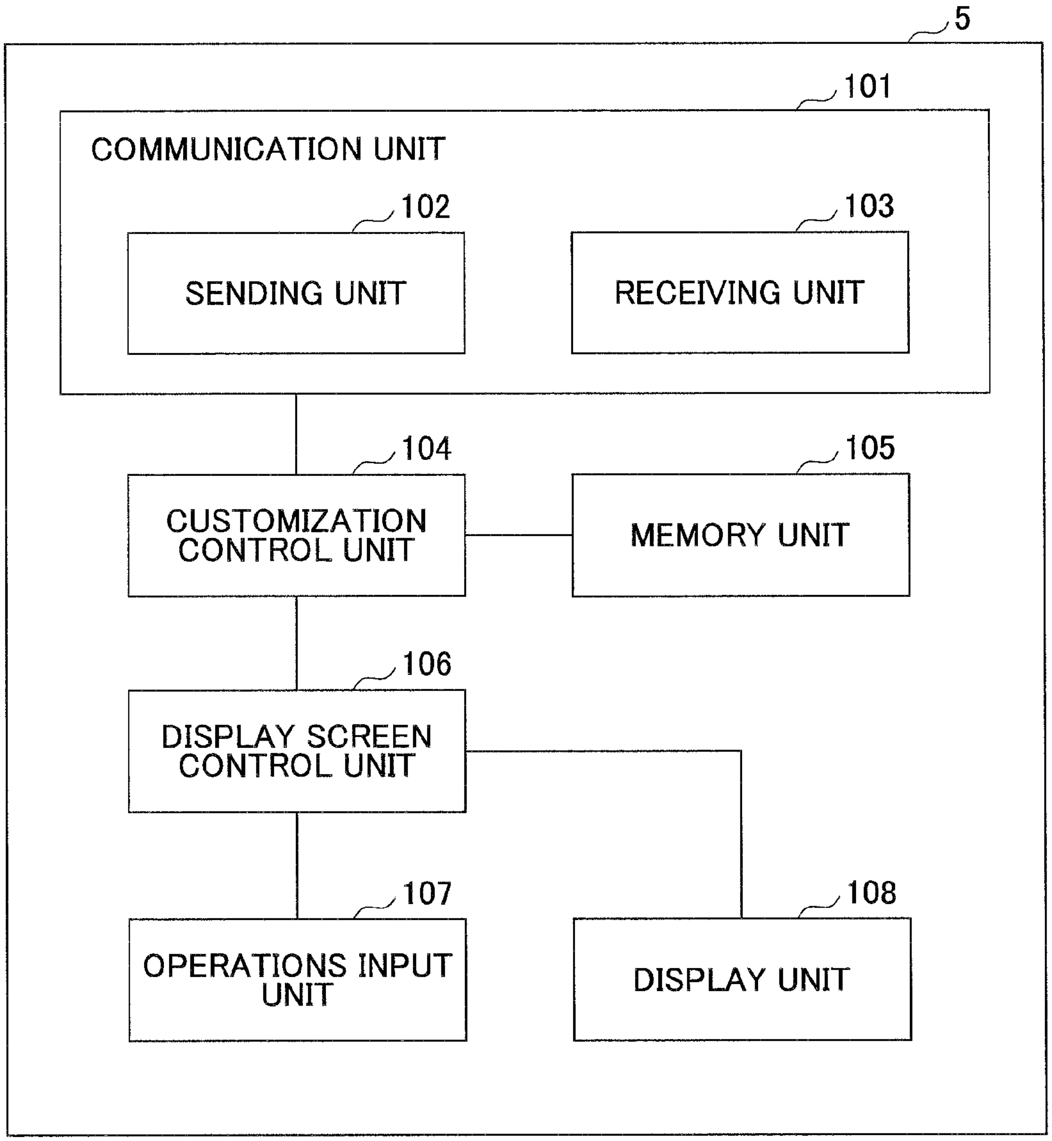
FIG. 4 is a block chart illustrating an example of the MFP of the embodiment.

The hardware of the MFP 5 of the embodiment is described. FIG. 4 is a block chart illustrating an exemplary function of the MFP 5 of the embodiment.

The MFP 5 illustrated in FIG. 4 includes a communication unit 101, a customization control unit 104, a memory unit 105, a display screen control unit 106, an operations input unit 107 and a display unit 108. The communication unit 101 exchanges data with the information processing apparatus 1 and the server 2. The communication unit 101 includes a sending unit 102 and a receiving unit 103.

For example, the sending unit 102 sends information stored in the memory unit 105 to the information processing apparatus 1. The receiving unit 103 outputs information related to the UI screen from the server 2 and outputs it to the display screen control unit 106.

The customization control unit 104 acquires content of the customization directed by the operations input unit 107 via the display screen control unit 106 and controls the customization. For example, the customization relates to screen transition.

The customization control unit 104 holds conditional information associated with UI components, screens, conditions and so on necessary for screens prior to and following each screen of concern. Conditional information is stored in the memory unit 105 or another memory unit. The customization control unit 104 may read and acquire the conditional information from the memory unit 105. The conditional information described later is held by the server 2 or the information processing apparatus 1 and properly acquired by the customization control unit 104.

FIG. 5 illustrates an example of the conditional information. As illustrated in FIG. 5, the conditional information pieces are associated with preconditions of screen items, preconditions of information, postconditions of screen items and preconditions of information for each of the screens.

The preconditions of the screen items designate a required UI or a screen relative to the screen prior to the present screen. The UI is, for example, a button. The preconditions of the information are prerequisites for the screen transition to the present screen after satisfying the preconditions of the information.

The preconditions of the screen items designate a required UI or a screen relative to the screen following the present screen. The UI is, for example, a button. The postconditions of the information are prerequisites for the screen transition to the present screen after satisfying the postconditions of the information.

For example, since "all destination display screen" does not have conditional information pieces, customization such as addition and deletion can be given without affecting the previous and posterior screens. A previous screen of a "destination archive screen" requires a "destination archive button" as the preconditions of the screen items.

A previous screen of an "electronic document selecting screen" requires an "electronic document selecting button" as the precondition of the screen items. A posterior screen of the "electronic document selecting screen" requires a "reference source designating screen", a "search screen" and a "detailed document display screen" as the preconditions of the screen items. The reason why the posterior screen requires these screens is that the electronic document selecting screen includes a "reference button", a "search button" and "detailed document display button. When the "reference button" is pushed down, the screen transitions to the "reference source designating screen". When the "search button" is pushed down, the screen transitions to the "search screen". When the "detailed document display button" is pushed down, the screen transitions to the "detailed document display screen".

Referring back to FIG. 4, when the screen to be customized is obtained, the customization control unit 104 controls customization by referring to the conditional information illustrated in FIG. 5. A method of controlling the customization is described later using examples. The customization control unit 104 updates the screen transition information stored in the memory unit 105 so as to be customized.

The memory unit 105 stores the screen transition information. FIG. 6 is an example of the screen transition information. Referring to FIG. 6, the screen transition information is displayed. Here, a hierarchical structure of the screen transition is displayed in a tree structure with XML syntax. Referring to FIG. 6, a "layout" tag illustrates a hierarchical structure of Small Web Format (SWF) of each screen information piece. A SWF file is one of file formats of Flash ("Flash" is a registered trademark.)

Referring to FIG. 6, "FAX/scanner" in a part al designates a top screen. In parts a11 to a13, screens positioned lower than the top screen "FAX/scanner" designated in the part al are designated. An "original reading dialogue" is designated in the part a11. A "setup confirmation and preview" screen is designated in the part a12. An "electronic document selecting" screen is designated in the part a13.

In parts a121 and a122, screens lower than the screen designated by the part a12 are designated. The screen designated in the part a121 is an "original reading dialogue". The screen designated in the part a122 is a "preview" screen. In parts a131 and a133, screens lower than the screen designated by the part a13 are designated. In the part a131, a "reference source designating" screen is designated. In the part a132, a "document search" screen is designated. In the part a133, a "detailed document" screen is designated.

Figure 7:
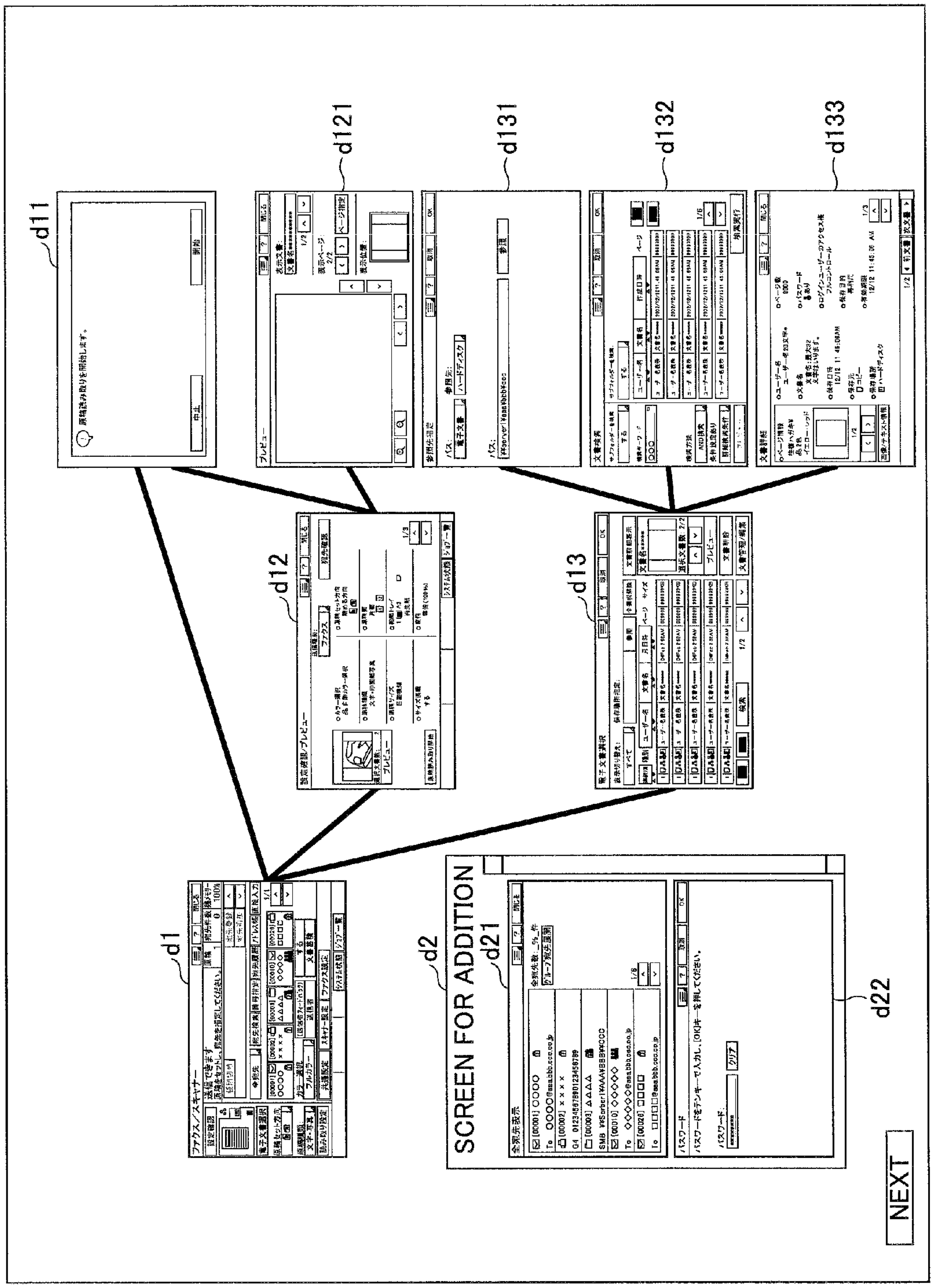
FIG. 7 is an example of screen transition displaying a tree structure.

FIG. 7 illustrates an example of the screen transition in the form of a tree structure illustrated in FIG. 6. Referring to FIG. 7, the screen transition is connected by lines. Referring to FIG. 7, the transition information is displayed by connecting the screens with the lines. However, it is possible to use a UI which further facilitates understanding of the screen transition by directly connecting the buttons and screens with lines.

The screen d1 corresponds to an SWF file described by the part al illustrated in FIG. 6. The screen d11 corresponds to an SWF file described by the parts a11 and a121 illustrated in FIG. 6. The screen d12 corresponds to an SWF file described by the part a12 illustrated in FIG. 6. The screen d13 corresponds to an SWF file described by the part a13 illustrated in FIG. 6. The screen d121 corresponds to an SWF file described by the part a122 illustrated in FIG. 6. The screen d131 corresponds to an SWF file described by the part a131 illustrated in FIG. 6. The screen d132 corresponds to an SWF file described by the part a132 illustrated in FIG. 6. The screen d133 corresponds to an SWF file described by the part a133 illustrated in FIG. 6.

FIG. 7 is an operations screen displayed at a time of customizing the screen transition. There is a window d2 for screen for addition in FIG. 7. By dragging and dropping screens d21 and d22 inside the window d2, the user may freely add the screens. The screen inside the screen for addition may be acquired from the server 2. It is possible to delete an unnecessary screen from the screen illustrated in FIG. 7.

Referring back to FIG. 4, the display screen control unit 106 controls the screen to be displayed. For example, the display screen control unit 106 reports the content of the customizing operation to the customization control unit 104 when the customizing operation is carried out on the displayed screen. When a customization reflecting report is received from the customization control unit 104, the display screen control unit 106 outputs the customization reflecting report to the display unit 108.

The operations input unit 107 receives operations by the user. The operations input unit 107 receives a customizing operation from a screen illustrated in FIG. 7 and reports the content of the customizing operation to the display screen control unit 106.

The display unit 108 displays the operations screen. For example, the display unit 108 displays the customizing operation screen as illustrated in FIG. 7 or operations screen for various applications. The display unit 108 generates the customizing operation screen by which the screen transition is visualized based on the screen transition information.

With the above structure, the MFP 5 enables the user to easily customize the screen transition using the customizing operation screen in which the screen transition is displayed in a tree structure.

(Operations)

The operations of the MFP 5 of the embodiment are described next.

Figure 8:
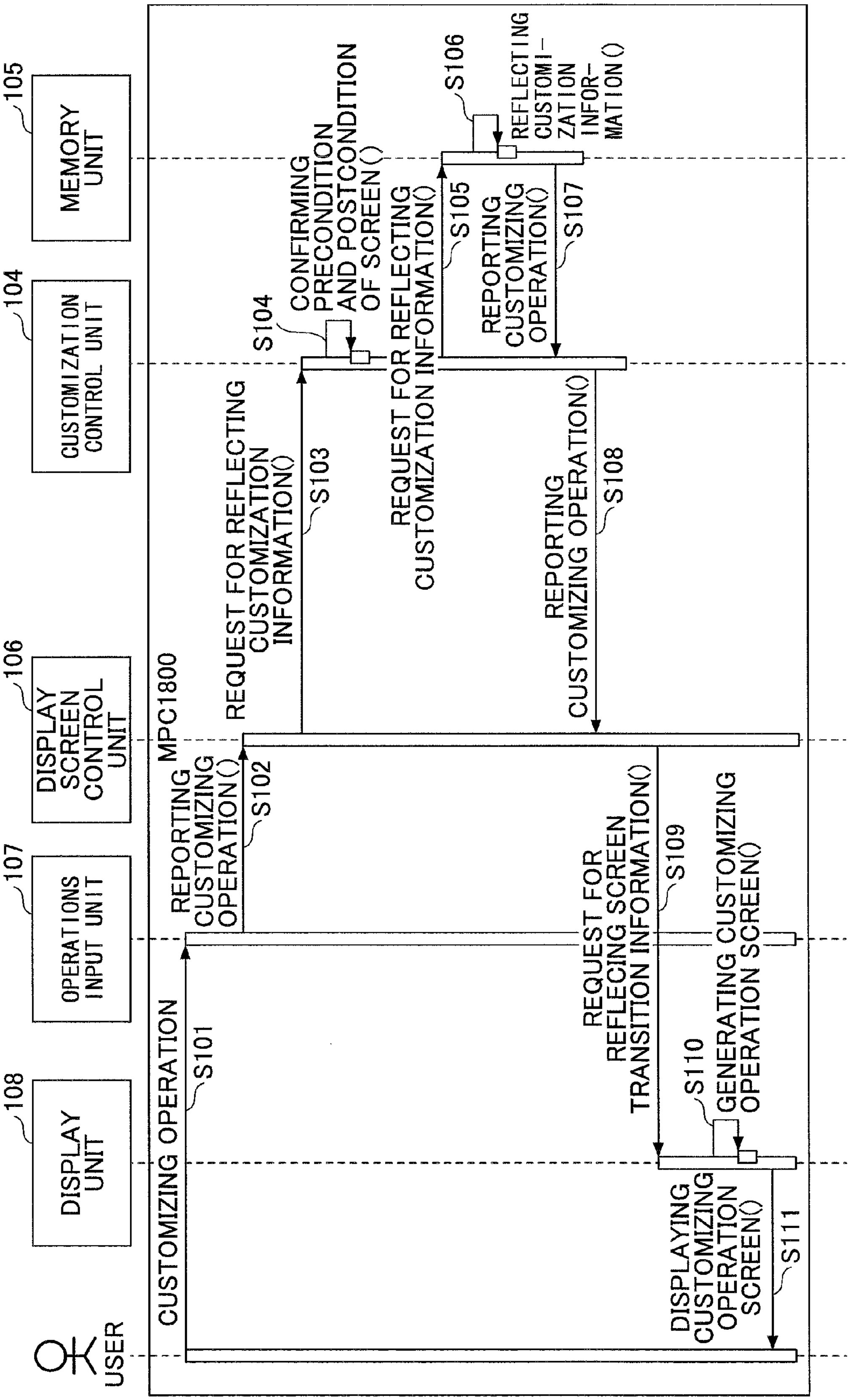
FIG. 8 illustrates an example of a customizing process in the embodiment.

FIG. 8 is a sequence chart illustrating an exemplary customizing process of the embodiment. In step S101 illustrated in FIG. 8, the operations input unit 107 receives the customizing operation by the user via the customizing operation screen (see FIG. 7) displayed on the display unit 108.

In step S102, the operations input unit 107 reports the content of the customizing operation to the display screen control unit 106.

In step S103, the display screen control unit 106 requests the customization control unit 104 to reflect customization information indicative of the customizing operation to the customization control unit 104.

In step S104, the customization control unit 104 refers to the conditional information corresponding to the screen to be customized and confirms whether a change may be added to the screen to be customized or a screen prior to or following the screen to be customized (a previous or posterior screen). This is confirmed by checking the preconditions or postconditions of the screen to be customized or the screen prior to or following the screen to be customized (the previous or posterior screen).

In step S105, the customization control unit 104 requests the memory unit 105 to reflect the customization information including customization of the screen prior to or following the screen to be customized based on the confirmed preconditions or postconditions.

In step S106, the memory unit 105 changes the screen transition information so as to reflect the customization information on the screen transition information. For example, the customization information may be changed to add or delete a screen, or add or delete a button on the previous or posterior screen.

In step S107, the memory unit 105 reports reflection of the customization information including the updated screen transition information to the customization control unit 104.

In step S108, the customization control unit 104 reports reflection of the customization information including the updated screen transition information to the display screen control unit 106.

In step S109, the display screen control unit 106 requests the display unit 108 to reflect the updated screen transition information.

In step S110, the display unit 108 generates a customizing operation screen having a tree structure based on the updated screen transition information. As a method of generating the transition screen, the display unit 108 acquires the SWF files corresponding to the screens in the tree structure described by the XML syntax, reduces the sizes of the screens and connects the reduced-size screens with lines as illustrated in FIG. 7.

In step S111, the display unit 108 displays the generated customizing operation screens. Therefore, the screen transition is displayed with a hierarchical structure. Even if the screen transition is frequently customized, the user can freely customize the screen transition.

<Examples of the Customization>

By using various examples of the customizations, a customization control in the embodiment is explained next.

(Addition of all Destination Display Screen)

Figure 9:
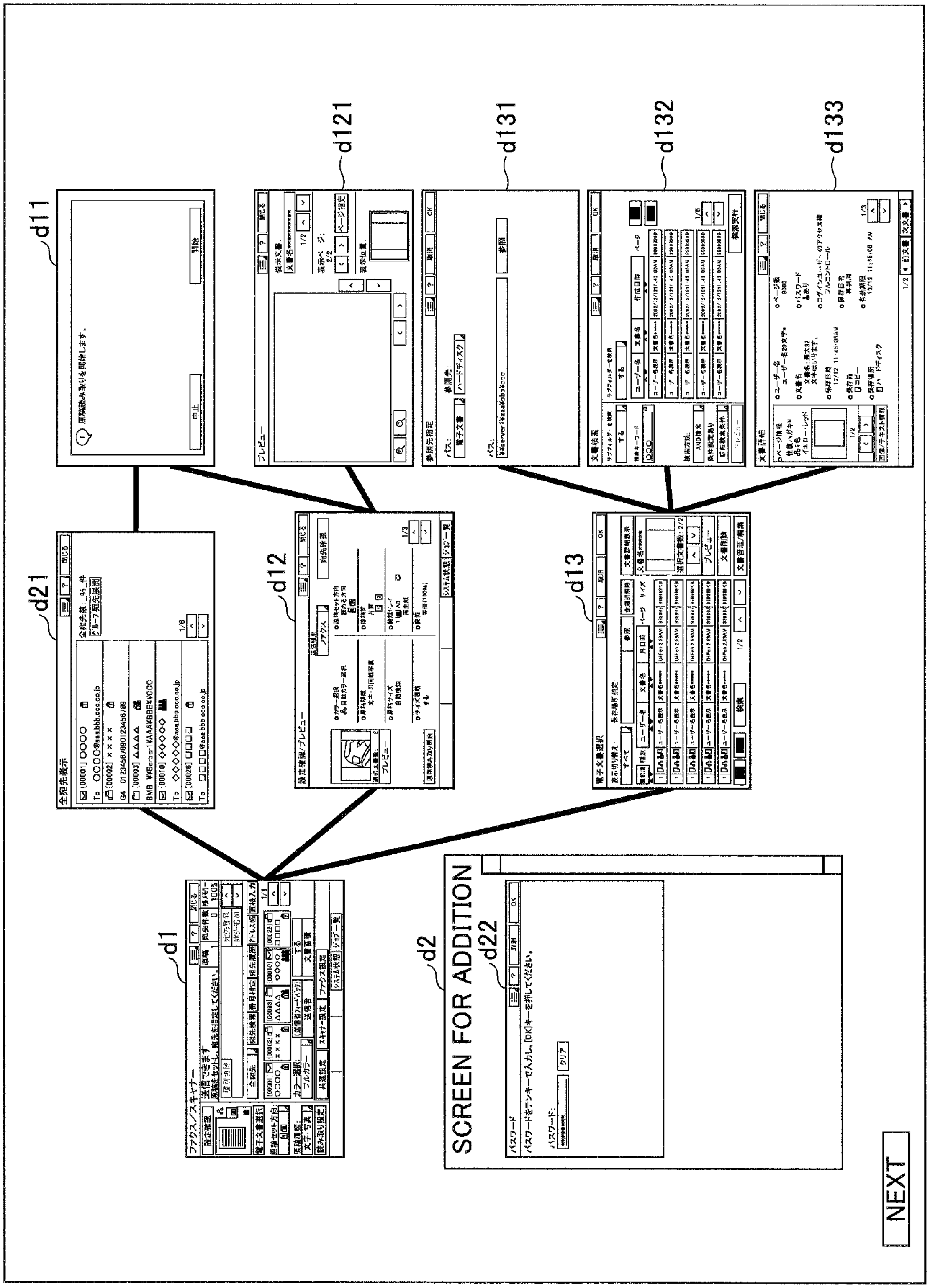
FIG. 9 illustrates a first customizing example of the embodiment.

FIG. 9 illustrates a first customizing example of the embodiment. Referring to FIG. 9, if the user drags and drops a screen d21 (an all destination display screen) inside the screen for addition of d2 between the screen d1 and the screen d11, the operations input unit 107 detects the operation and reports the content of the customizing operation to the display screen control unit 106.

At this time, the operations input unit 107 reports the additional screen information to show which screen is added to which position. FIG. 10 illustrates an example of first additional screen information. As illustrated in FIG. 10, the additional screen information associates the additional screen with the screen (the previous screen) prior to the additional screen and the screen (the posterior screen) following the additional screen. In the additional screen information illustrated in FIG. 9, the previous screen is the "scanner or facsimile top screen", the additional screen is the "all destination display screen" and the posterior screen is the "original reading dialogue".

When the customization control unit 104 acquires the additional screen information from the display screen control unit 106, the preconditions and the postconditions of the additional screen are confirmed by referring to the conditional information (see FIG. 5). The customization control unit acquires the preconditions and the postconditions of the additional screen from the conditional information.

FIG. 11 illustrates an example of first preconditions and postconditions of the additional screen information. Referring to FIG. 11, the preconditions and the postconditions of the "all destination display screen" are entirely "NON". Therefore, it is known that the screen to be customized and screens prior to and following the screen to be customized may not be changed.

Therefore, the customization control unit 104 may simply determine that the "all destination display screen" can be inserted between the "scanner or facsimile top screen" and the "original reading dialogue".

The customization control unit 104 controls to update the screen transition information stored in the memory unit 105 based on the confirmed preconditions and postconditions. FIG. 12 illustrates an example of the first updated screen transition information. Referring to FIG. 12, because the preconditions and the postconditions are entirely "NON", the customization control unit 104 may add a layout node of the "all destination display screen" to be added to the screen transition information. A part a21 is the added layout node.

If the display screen control unit 106 acquires the updated screen transition information, the display screen control unit 106 requests the display unit 108 to generate the customizing operation screen based on the updated screen transition information to the display unit 108.

The display unit 108 generates the customizing operation screen based on the updated screen transition information and displays the generated customizing operation screen. With this, the user may easily customize the screen transition using the customizing operation screen on which the screen transition in the tree structure is displayed.

(Addition of the Destination Archive Screen)

Figure 13:
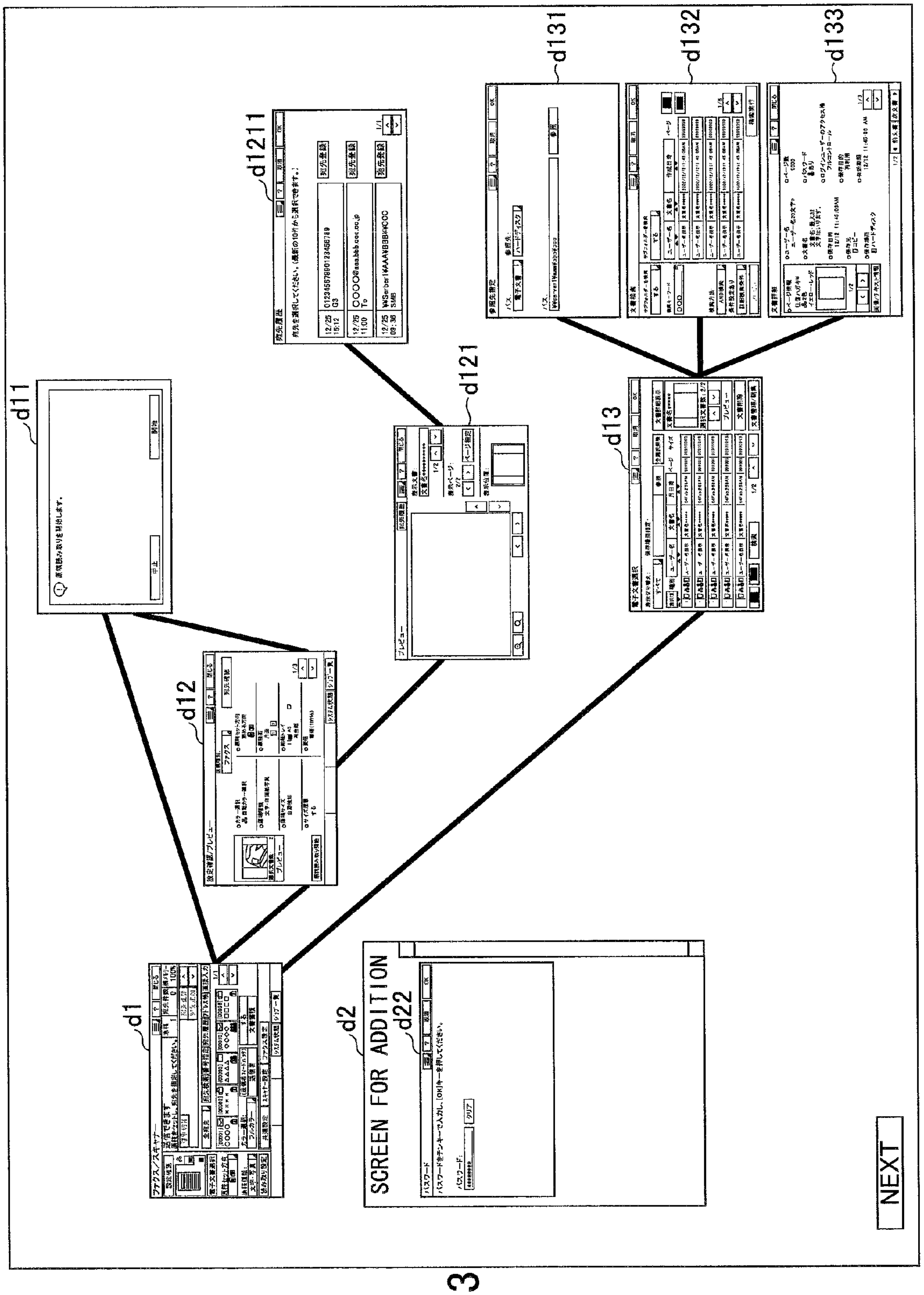
FIG. 13 illustrates a second customizing example of the embodiment.

FIG. 13 illustrates a second customizing example of the embodiment. Referring to FIG. 13, if the user drags and drops a screen d1211 inside the screen for addition d2 following the screen d121, the operations input unit 107 detects the operation and reports the content of the customizing operation to the display screen control unit 106.

At this time, the operations input unit 107 reports the additional screen information to show which screen is added to which position. FIG. 14 illustrates an example of second additional screen information. As illustrated in FIG. 14, the additional screen information associates the additional screen with the screen (the previous screen) prior to the additional screen and the screen (the posterior screen) following the additional screen. In the additional screen information illustrated in FIG. 14, the previous screen is the "preview screen", the additional screen is the "destination archive screen" and the posterior screen is "NON".

When the customization control unit 104 acquires the additional screen information from the display screen control unit 106, the preconditions and the postconditions of the additional screen are confirmed by referring to the conditional information (see FIG. 5). The customization control unit acquires the preconditions and the postconditions of the additional screen from the conditional information.

FIG. 15 illustrates an example of second preconditions and postconditions of the additional screen information. Referring to FIG. 15, the preconditions of the screen items among the preconditions of the "destination archive screen" is the "destination archive button". The preconditions and the postconditions of the other information are entirely "NON". With this, the customization control unit 104 may determine that the "destination archive button is required to exist on the screen prior to the destination archive screen to be added to.

The customization control unit 104 controls to update the screen transition information stored in the memory unit 105 based on the confirmed preconditions and postconditions. At this time, the customization control unit 104 carries out a process related to the existing preconditions illustrated in FIG. 16.

Figure 16:
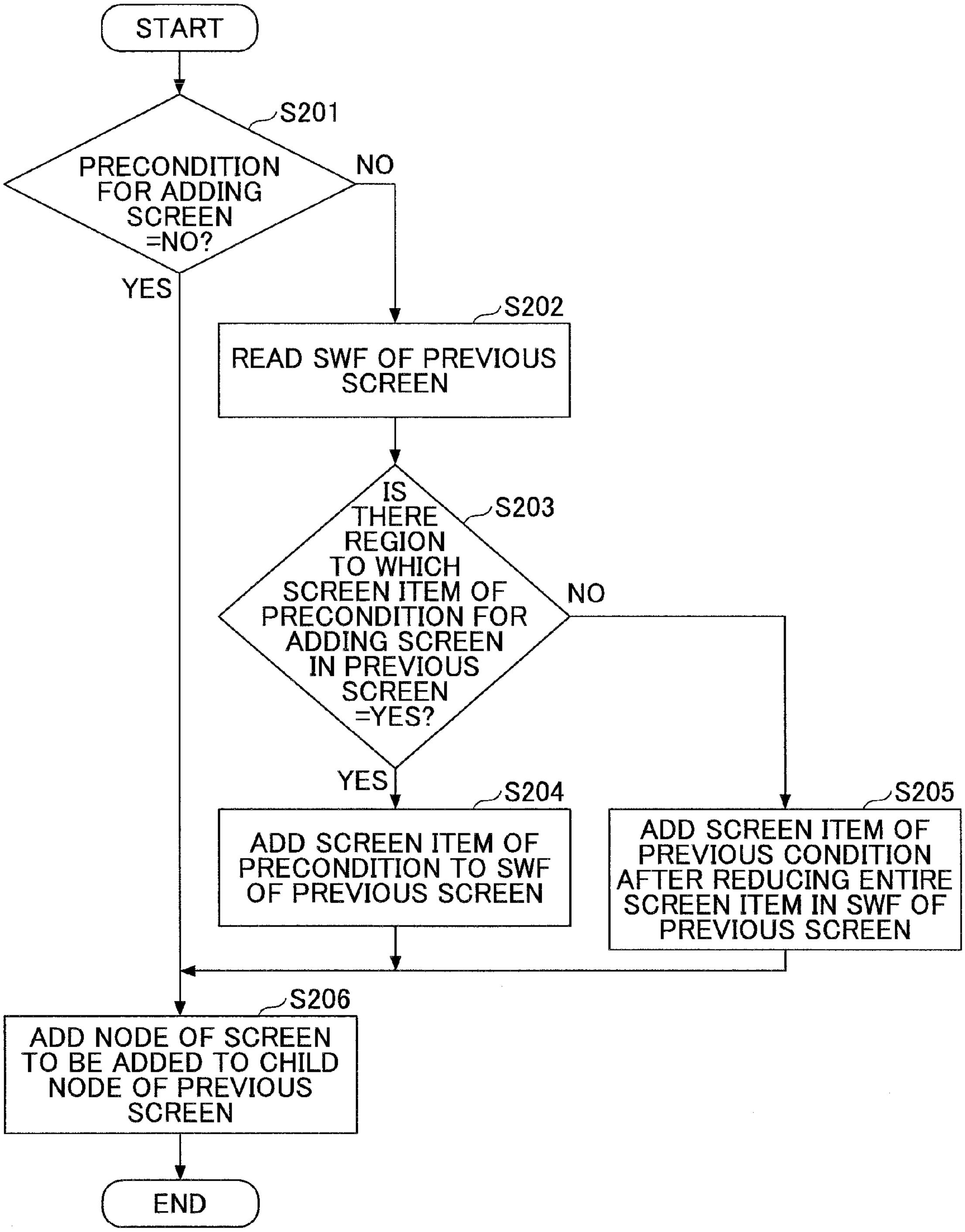
FIG. 16 is a flowchart illustrating an exemplary process for preconditions of the embodiment.

FIG. 16 is a flowchart illustrating an exemplary process for the preconditions of the embodiment. In step S201 illustrated in FIG. 16, the customization control unit 104 determines whether there are preconditions for the additional screen. If there is no precondition in YES of step S201, the process goes to step S206. If there is a precondition in NO of step S201, the process goes to step S202.

In step S202, the customization control unit 104 reads the SWF file of the previous screen based on the screen transition information.

In step S203, the customization control unit 104 determines whether the previous screen has a region to which a screen item of the preconditions can be added. If there is no region in YES of step S203, the process goes to step S204. If there is a precondition in NO of step S203, the process goes to step S205.

In step S204, the customization control unit 104 adds a screen item of the preconditions (a destination archive button) to the SWF file of the previous screen. In step S204, the screen item is added to a space on the screen. However, the user may select the region where the screen item is to be added.

In step S205, the customization control unit 104 reduces the sizes of the entire screen items in the SWF files of the previous screen and adds the screen items of the preconditions. The arrangement of the screen items in the SWF files of the previous screen may be changed to keep the space for the screen item to be added.

Figure 17:
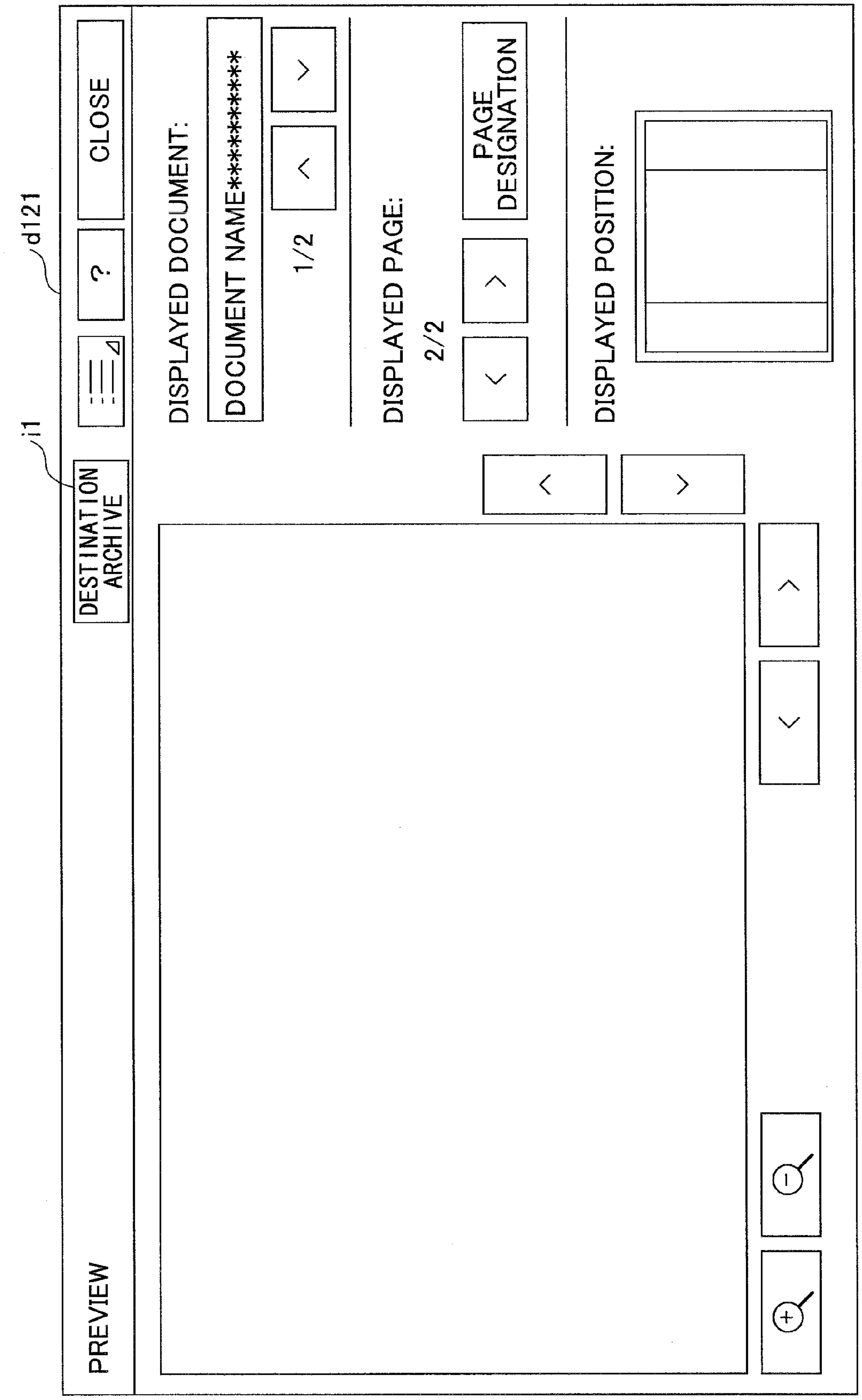
FIG. 17 illustrates a first exemplary screen to which screen items are added to a previous screen.

FIG. 17 illustrates a first exemplary screen to which screen items are added to the prescreen. The "destination archive button" it is added to the "preview screen" of the previous screen d121 illustrated in FIG. 17.

In step S206, the customization control unit 104 adds a node of the additional screen to a child node of a layout corresponding to the previous screen of the additional screen.

With this, if there is a screen item to be added to the previous screen, the screen item may be automatically added to the previous screen.

Meanwhile, the customization control unit 104 confirms whether a change can be reflected on a screen to be added (a destination archive screen). This is because there are cases where the screen to be added is changed by the influence of the screen prior to the screen to be added and where the screen to be added is changed by the influence of the screen following the screen to be added.

Figure 18:
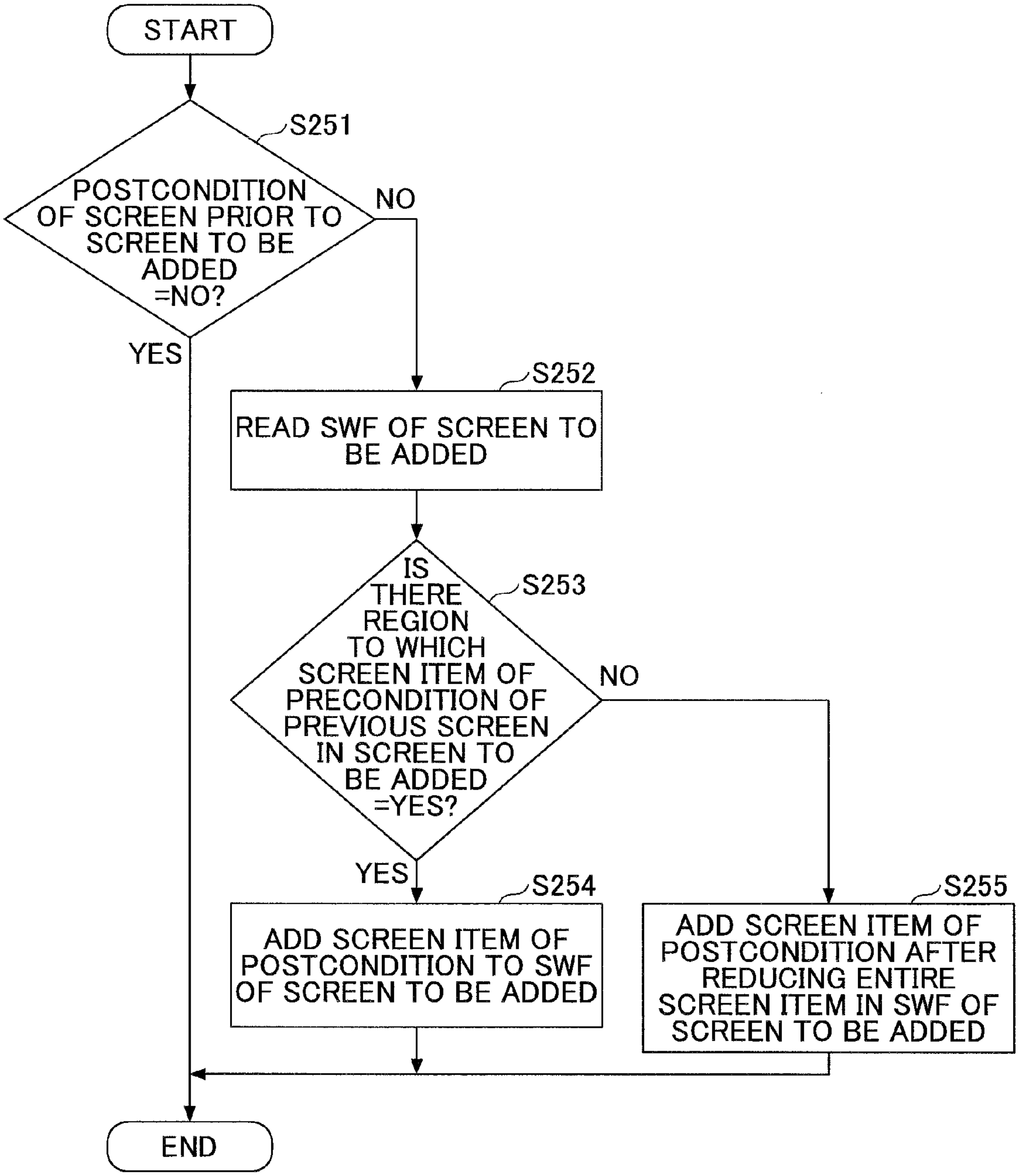
FIG. 18 is a flowchart illustrating exemplary postconditions for a screen prior to a screen to be added.

FIG. 18 is a flowchart illustrating exemplary postconditions for the screen prior to the screen to be added. In step S251 illustrated in FIG. 18, the customization control unit determines whether there are postconditions for the screen prior to the screen. If there is no postcondition in YES of step S251, the process ends. If there are the postconditions in NO of step S251, the process goes to step S252.

In step S252, the customization control unit 104 reads the SWF file to be added.

In step S253, the customization control unit 104 determines whether the screen (the previous screen) prior to the screen the screen to be added has a region to which the screen item of the postconditions is added. If there is the region in YES of step S253, the process goes to step S254. If there is no region in NO of step S253, the process goes to step S255.

In step S254, the customization control unit 104 adds the screen item of the postcondition to the SWF file of the screen to be added. In step S254, the screen item is added to a space on the screen. However, the user may select the region where the screen item is to be added.

In step S255, the customization control unit 104 reduces the sizes of the entire screen items in the SWF files and adds the screen items of the preconditions. The arrangement of the screen items in the SWF files of the screen to be added may be changed to keep the spaces for the screen items to be added.

In the customization illustrated in FIG. 13, the screen prior to the addition is the "preview screen" and the postcondition of the "preview screen" is "NON" as illustrated in FIG. 5. Therefore, the process goes to "YES" in step S251. Thus the confirmation process ends.

Figure 19:
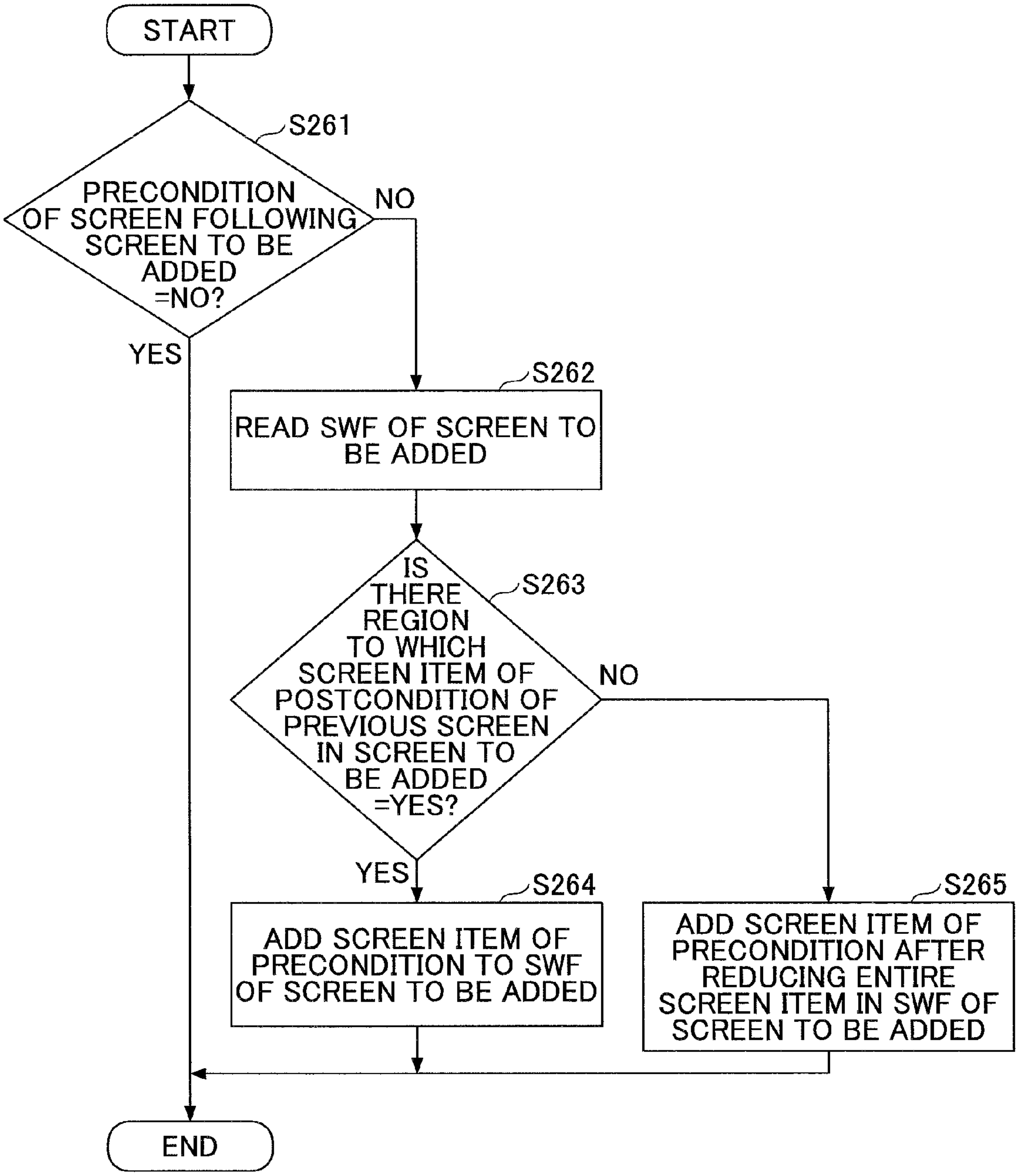
FIG. 19 is a flowchart illustrating exemplary preconditions for a screen following a screen to be added.

FIG. 19 is a flowchart illustrating exemplary preconditions for the screen following the screen to be added. In step S261 illustrated in FIG. 19, the customization control unit 104 determines whether there are postconditions for the screen following the screen. If there is no postcondition in YES of step S261, the process ends. If there are the post conditions in NO of step S261, the process goes to step S262.

In step S262, the customization control unit 104 reads the SWF file to be added.

In step S263, the customization control unit 104 determines whether the screen (the posterior screen) following the screen to be added has a region to which the screen item of the preconditions is added. If there is the region in YES of step S263, the process goes to step S264. If there is no region in NO of step S263, the process goes to step S265.

In step S264, the customization control unit 104 adds the screen items of the preconditions to the SWF file of the screen to be added. In step S264, the screen item is added to a space on the screen. However, the user may select the region where the screen item is to be added.

In step S265, the customization control unit 104 reduces the sizes of the entire screen items in the SWF files and adds the screen items of the preconditions. The arrangement of the screen items in the SWF files of the screen to be added may be changed to keep the spaces for the screen items to be added.

In the example illustrated in FIG. 13, because the screen following the screen to be added is "NON", the process illustrated in FIG. 19 is not carried out.

The customization control unit 104 updates the screen transition information by the processes illustrated in FIG. 16, FIG. 18 and FIG. 19. FIG. 20 illustrates an example of the second updated screen transition information. In the example illustrated in FIG. 20, the customization control unit 104 adds the layout node of the "destination archive screen" to be added to the screen transition information. A part a31 illustrated in FIG. 20 is the added layout node. To the SWF file of the preview screen, the "destination archive button" is added.

If the display screen control unit 106 acquires the updated screen transition information, the display screen control unit 106 requests the display unit 108 to generate the customizing operation screen based on the updated screen transition information to the display unit 108.

Referring to FIG. 13, the display unit 108 generates the customizing operation screen based on the updated screen transition information and displays the generated customizing operation screen. At this time, since the "destination archive button" i1 is already added to the preview screen d121, the SWF file may not be changed. With this, the customization of the screen transition can be easily done and the screen items can be automatically added using the additional screen.

(Addition of the Electronic Document Selecting Screen)

Figure 21:
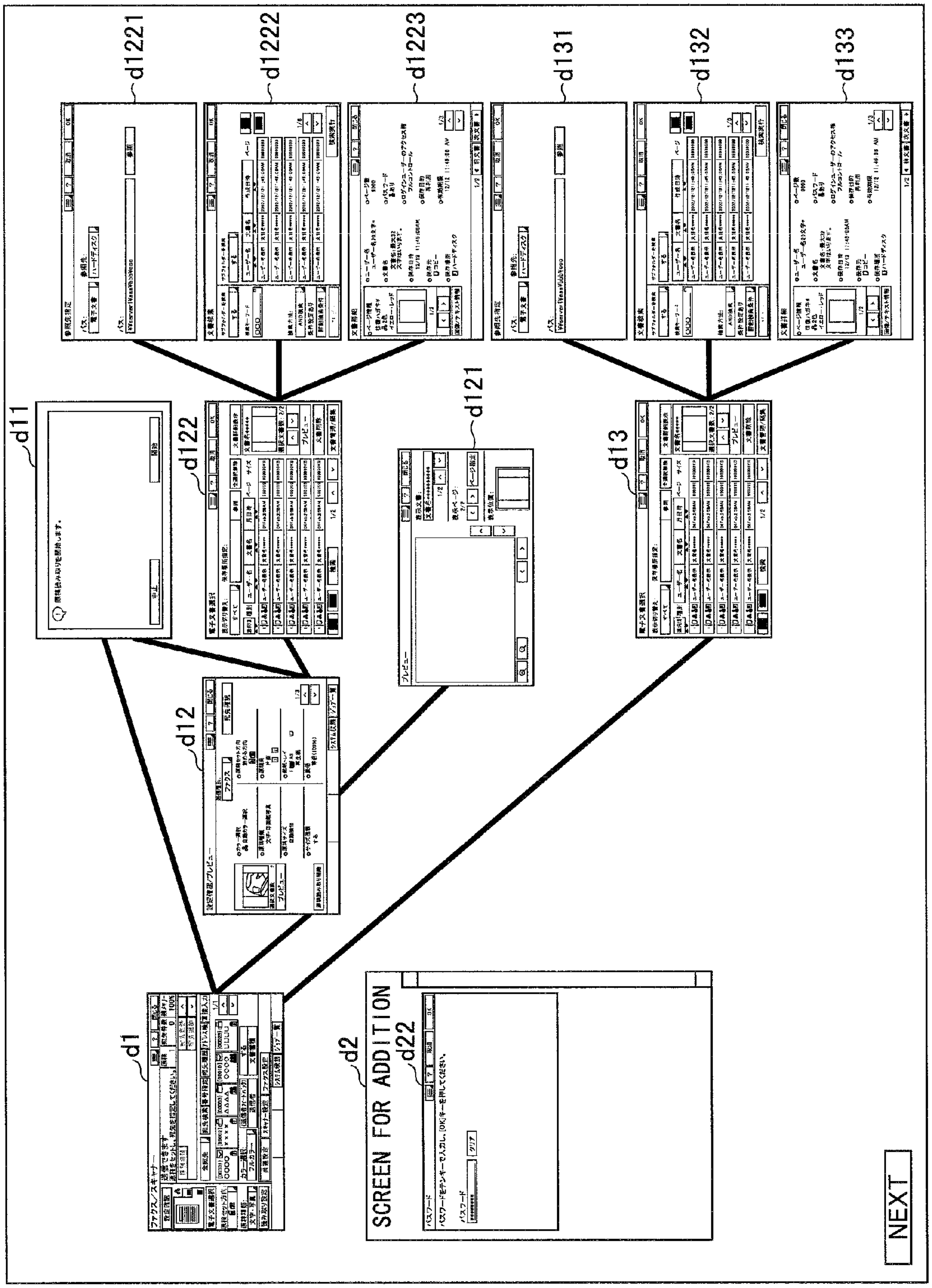
FIG. 21 illustrates a third customizing example of the embodiment.

FIG. 21 illustrates a third customizing example of the embodiment. Referring to FIG. 21, if the user drags and drops a screen d122 inside the screen for addition d2 after the screen d12, the operations input unit 107 detects the operation and reports the content of the customizing operation to the display screen control unit 106.

At this time, the operations input unit 107 reports the additional screen information to show which screen is added to which position. FIG. 22 illustrates an example of third additional screen information. As illustrated in FIG. 22, the additional screen information associates the additional screen with the screen (the previous screen) prior to the additional screen and the screen (the posterior screen) after the additional screen. In the additional screen information illustrated in FIG. 22, the previous screen is the "setup confirmation and preview screen", the additional screen is the "electronic document selecting screen" and the posterior screen is "NON".

When the customization control unit 104 acquires the additional screen information from the display screen control unit 106, the preconditions and the postconditions of the additional screen are confirmed by referring to the conditional information (see FIG. 5). The customization control unit 104 acquires the preconditions and the postconditions of the additional screen from the conditional information.

FIG. 23 illustrates an example of third preconditions and postconditions of the additional screen information. Referring to FIG. 23, the preconditions of the screen items among the preconditions of the "electronic document selecting screen" is the "electronic document selecting button". The postconditions of the screen items among the postconditions of the "electronic document selecting screen" is the "reference source designating screen", "search screen" and "detailed document display screen". The preconditions and the postconditions of the other information are entirely "NON". With this, the customization control unit 104 may determine that the previous screen of the "electronic document selecting screen" requires the "electronic document selecting button" and the posterior screen of the "electronic document selecting screen" requires a "reference source designating screen", a "search screen" and a "detailed document display screen".

The customization control unit 104 controls to update the screen transition information stored in the memory unit 105 based on the confirmed preconditions and postconditions. At this time, the customization control unit 104 carries out a process related to the existing preconditions illustrated in FIG. 16.

The customization control unit 104 may add the "electronic document selecting button" to the "setup confirmation and preview screen" by the process illustrated in FIG. 16.

Figure 24:
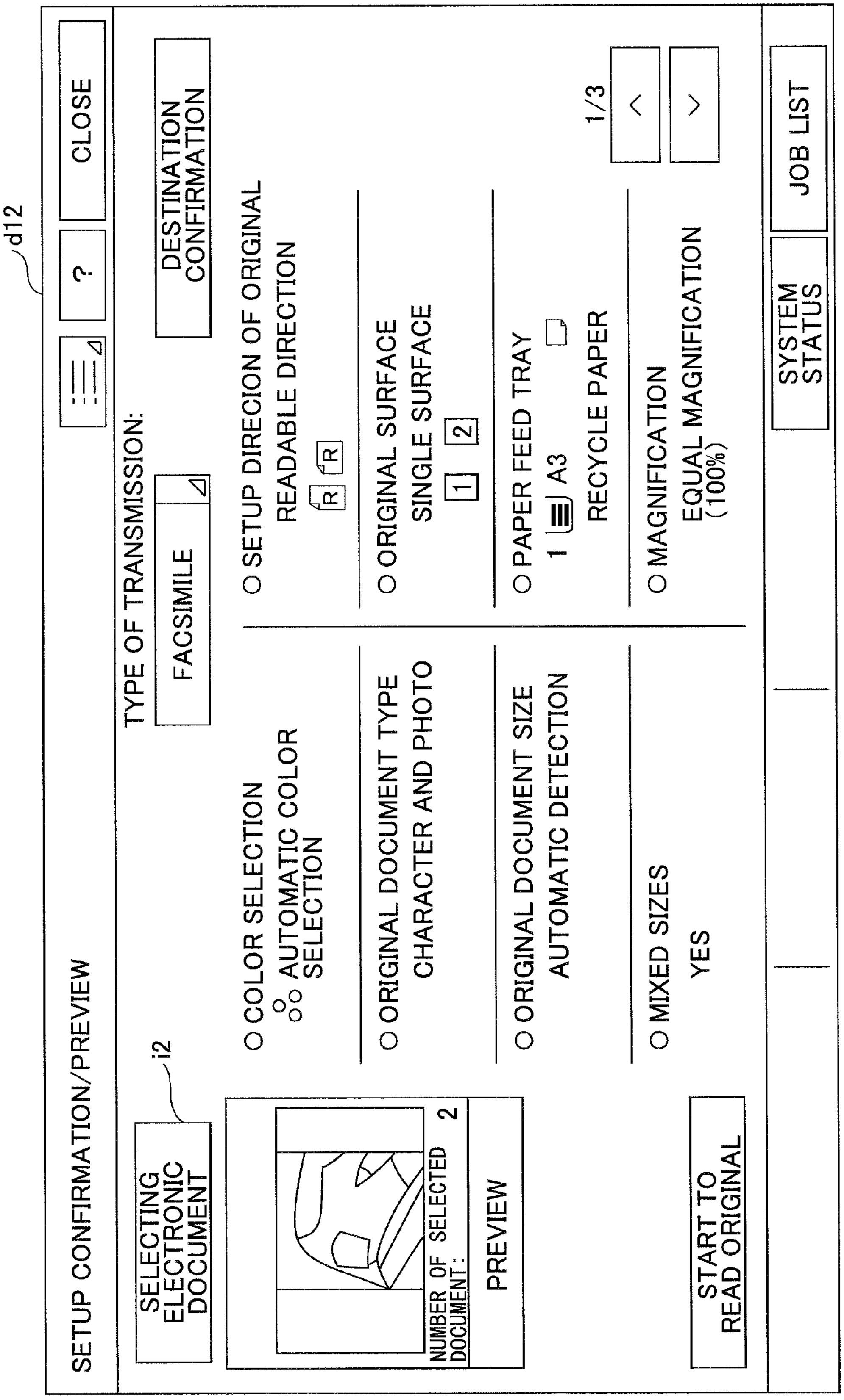
FIG. 24 illustrates a second exemplary screen in which screen items are added to the previous screen.

FIG. 24 illustrates a second exemplary screen to which screen items are added to the previous screen. Referring to FIG. 24, the "electronic document selecting button" i2 is added to the "setup confirmation and preview screen" of the previous screen d12.

With this, if there is a screen item to be added to the previous screen, the screen item may be automatically added to the previous screen.

Figure 25:
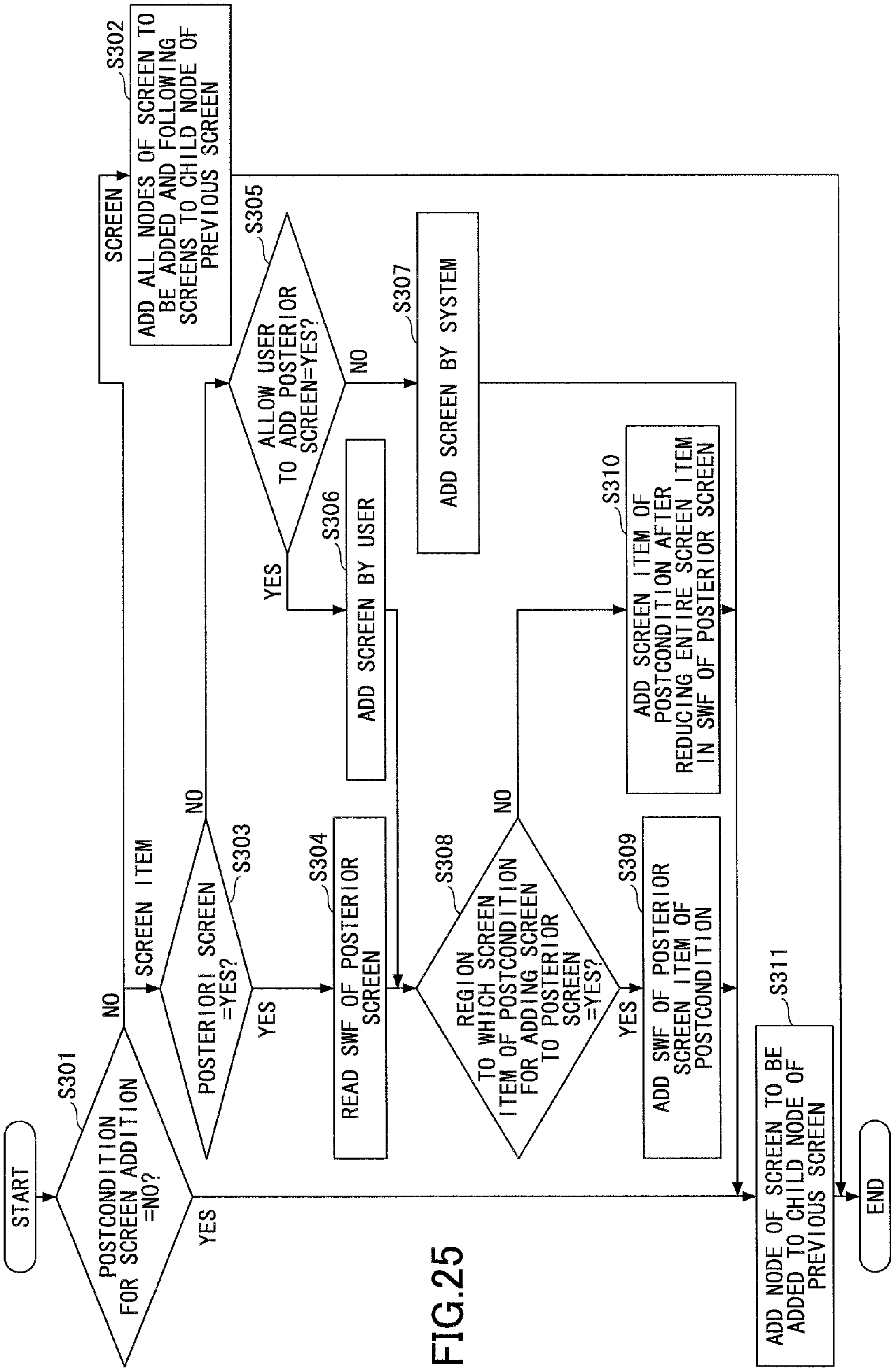
FIG. 25 is a flowchart illustrating an exemplary process for the preconditions of the embodiment.

If there are postconditions for the additional screen, the customization control unit 104 carries out a process for the postconditions illustrated in FIG. 25.

FIG. 25 is a flowchart illustrating an exemplary process for the preconditions of the embodiment. In step S301 illustrated in FIG. 25, the customization control unit 104 determines whether there are postconditions for the additional screen. If there are not any postcondition in YES of step S301, the process goes to step S311. If the postconditions are a screen item in NO of step S301, the process goes to step S303. If the postconditions are a screen in NO of step S301, the process goes to step S302.

In step S302, the customization control unit 104 controls to add nodes for the additional screen and following screens such as the screen of the postconditions as child nodes of the previous screen.

In step S303, the customization control unit 104 determines whether there is a posterior screen. If there is the posterior screen in YES of step S303, the process goes to step S304. If there is no posterior screen in NO of step S303, the process goes to step S305.

In step S304, the customization control unit 104 reads the SWF file of the posterior screen. In step S305, the customization control unit 104 makes the user determine whether the posterior screen is added. When the user selects the posterior screen, the process goes to step S306. When the user does not select the posterior screen, the process goes to step S307.

In step S306, the customization control unit 104 makes the user add the screen. For example, the customization control unit 104 displays candidates of the posterior screens on the display unit so that the user selects the candidates.

In step S307, the customization control unit 104 automatically adds the screen. This process may be adopted when a screen having no item is added and screen item of the postcondition is added to the screen.

Figure 26:
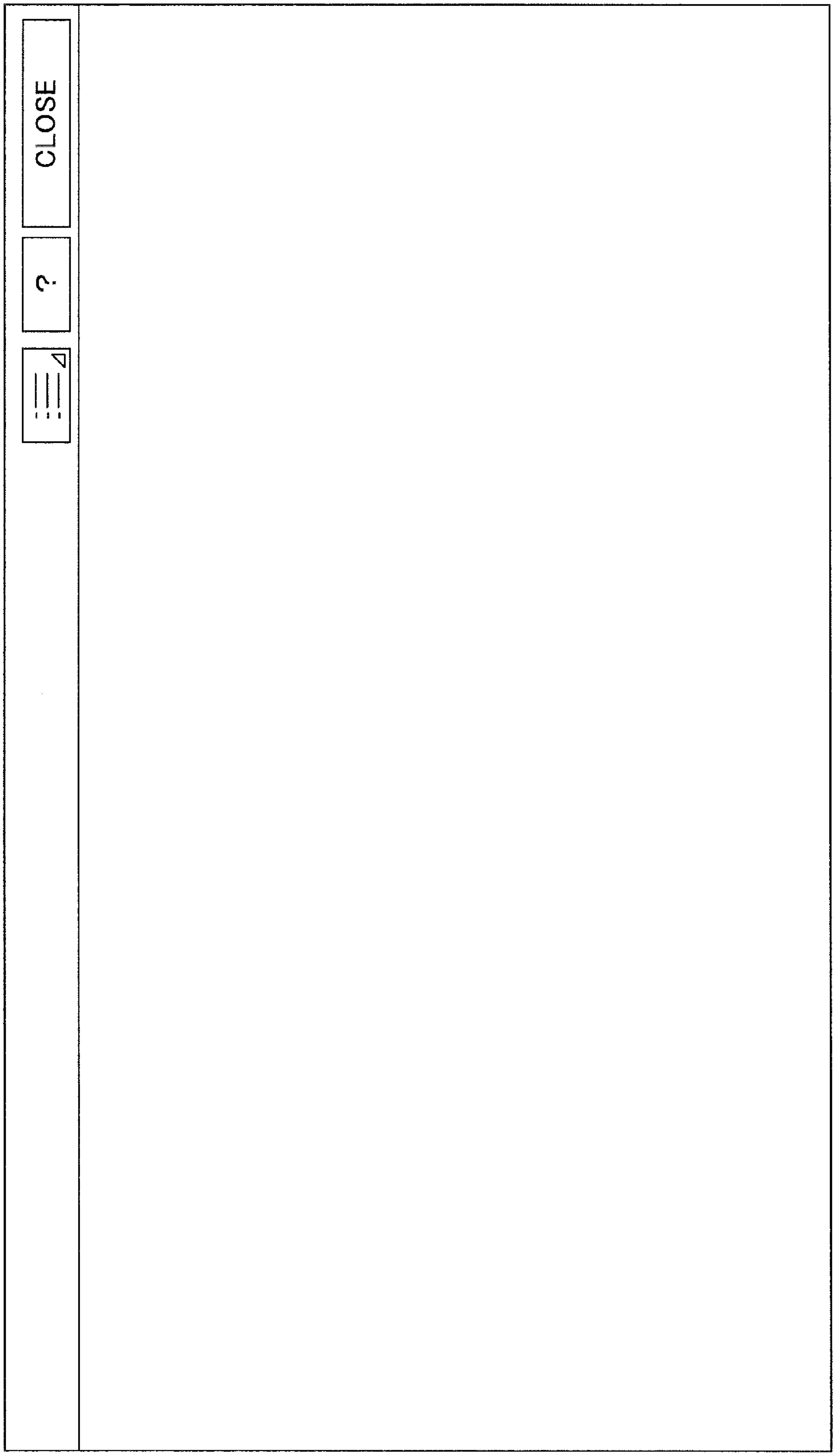
FIG. 26 illustrates an exemplary screen in which no screen item is included.

FIG. 26 illustrates an exemplary screen in which no screen item is included. If there is a screen item in the postconditions and no posterior screen is provided, the screen illustrated in FIG. 26 is added and a screen item may be added to the screen.

Referring back to FIG. 25, the customization control unit 104 determines whether the previous screen has a region to which the screen item of the postconditions can be added. If there is the region in YES of step S308, the process goes to step S309. If there is no region in NO of step S308, the process goes to step S310.

In step S309, the customization control unit 104 adds the screen item of the postcondition to the SWF file of the posterior screen. In step S309, the screen item is added to a space on the screen. However, the user may select the region where the screen item is to be added.

In step S310, the customization control unit 104 reduces the sizes of the entire screen items in the SWF files of the posterior screen and adds the screen items of the postconditions. The arrangement of the screen items in the SWF files of the posterior screen may be changed to keep the space for the screen item to be added.

In step S311, the customization control unit 104 adds anode of the additional screen to a child node of a layout corresponding to the previous screen of the additional screen. However, if there are the preconditions and the node of the additional screen is already added in the process for the preconditions, the process is unnecessary.

Meanwhile, a customization control unit 104 confirms whether a change can be reflected on a screen to be added. Specifically, the customization control unit 104 carries out processes illustrated in FIG. 18 and FIG. 19. In the example illustrated in FIG. 21, the screen prior to the screen to be added (the electronic document selecting screen) is the "setup confirmation and preview screen". The postconditions of the "setup confirmation and preview screen" is "NON" with reference to FIG. 5. Therefore, YES in step S251 is selected to finish the confirmation process.

As for the screen to be added (the electronic document selecting screen), a screen such as a search screen is added in step S302 illustrated in FIG. 25. The customization control unit 104 carries out the process illustrated in FIG. 19 for each posterior screen. Then, it is possible to add the "destination archive screen", the "reference button" or the "detailed document display button" to the screen to be added (see FIG. 5). If these buttons already exist on the screen, the buttons are not further added.

The customization control unit 104 updates the screen transition information by the processes illustrated in FIG. 16, FIG. 18, FIG. 19 and FIG. 25. FIG. 27 illustrates an example of the third updated screen transition information. In the example illustrated in FIG. 27, the customization control unit 104 adds the layout nodes of the "electronic document selecting screen" to be added and the following screens to the screen transition information. Apart a41 illustrated in FIG. 27 is the added layout node. The "electronic document selecting button" is added to the SWF file of the setup confirmation and preview screen.

If the display screen control unit 106 acquires the updated screen transition information, the display screen control unit 106 requests the display unit 108 to generate the customizing operation screen based on the updated screen transition information to the display unit 108.

Referring to FIG. 21, the display unit 108 generates the customizing operation screen based on the updated screen transition information and displays the generated customizing operation screen. At this time, since the "electronic document selecting button" is already added to the preview screen, the SWF file may not be changed. With this, the customization of the screen transition can be easily done and the screen items can be automatically added using the additional screen.

(Deletion 1 of the Electronic Document Selecting Screen)

Figure 28:
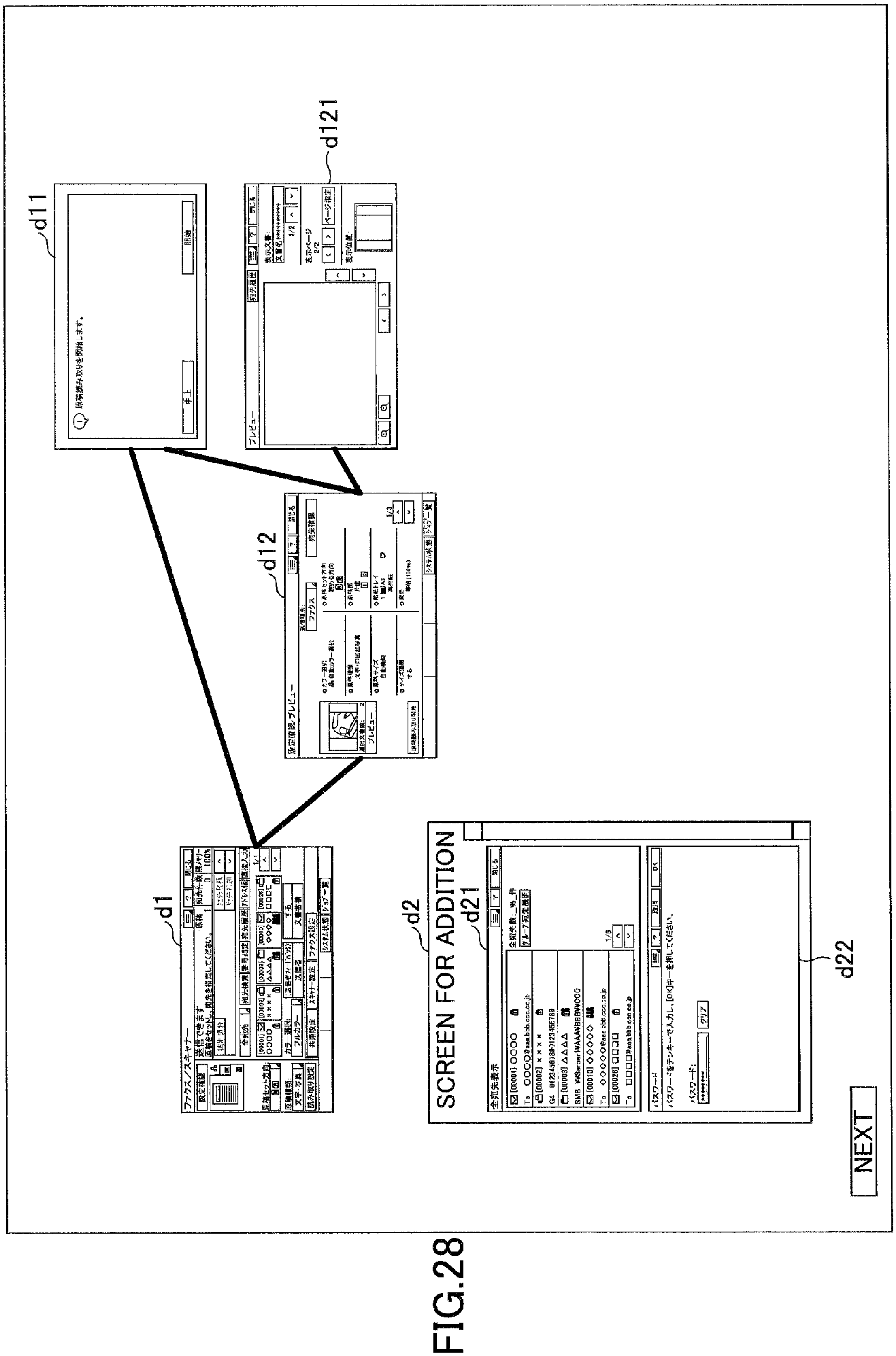
FIG. 28 illustrates a fourth customizing example of the embodiment.

FIG. 28 illustrates a fourth customizing example of the embodiment. In the example illustrated in FIG. 28, the user deletes the "electronic document selecting screen" d13 from the customizing operation screen. In the example, entire screens being the deletion screen and the following screens are simultaneously deleted. The operations input unit 107 detects the operation and reports the contents of the customizing operation to the display screen control unit 106.

At this time, the operations input unit 107 reports the deletion screen information to show which screen is deleted. FIG. 29 illustrates an example of deletion screen information. Referring to FIG. 29, the deletion screen information associates the deletion screen with a screen prior to the deletion screen (the previous screen) and a screen following the deletion screen (the posterior screen). In the deletion screen information illustrated in FIG. 29, the previous screen is the "scanner or facsimile top screen", the deletion screen is the "electronic document selecting screen", and the posterior screens are the "destination designating screen", the search screen", and the "document search screen".

When the customization control unit 104 acquires the deletion screen information from the display screen control unit 106, the preconditions and the postconditions of the deletion screen are confirmed by referring to the conditional information (see FIG. 5). The customization control unit 104 acquires the preconditions and the postconditions of the deletion screen from the conditional information.

FIG. 30 illustrates an example of the preconditions and the postconditions of the deletion screen information. Referring to FIG. 30, the precondition of the screen items among the preconditions of the "electronic document selecting screen" is the "electronic document selecting button". The postcondition of the screen items among the postconditions of the "electronic document selecting screen" are the "reference source designating screen", the "search screen" and the "detailed document display screen". The preconditions and the postconditions of the other information are entirely "NON". With this, the customization control unit 104 can determine that the "electronic document selecting button" may not be provided on a screen prior to the electronic document selecting screen.

The customization control unit 104 controls to update the screen transition information stored in the memory unit 105 based on the confirmed preconditions and postconditions. At this time, the customization control unit 104 carries out a process related to the existing preconditions illustrated in FIG. 31. Because the deletion screen and the screens following the deletion screen are entirely deleted, any process related to the postconditions may not be done.

Figure 31:
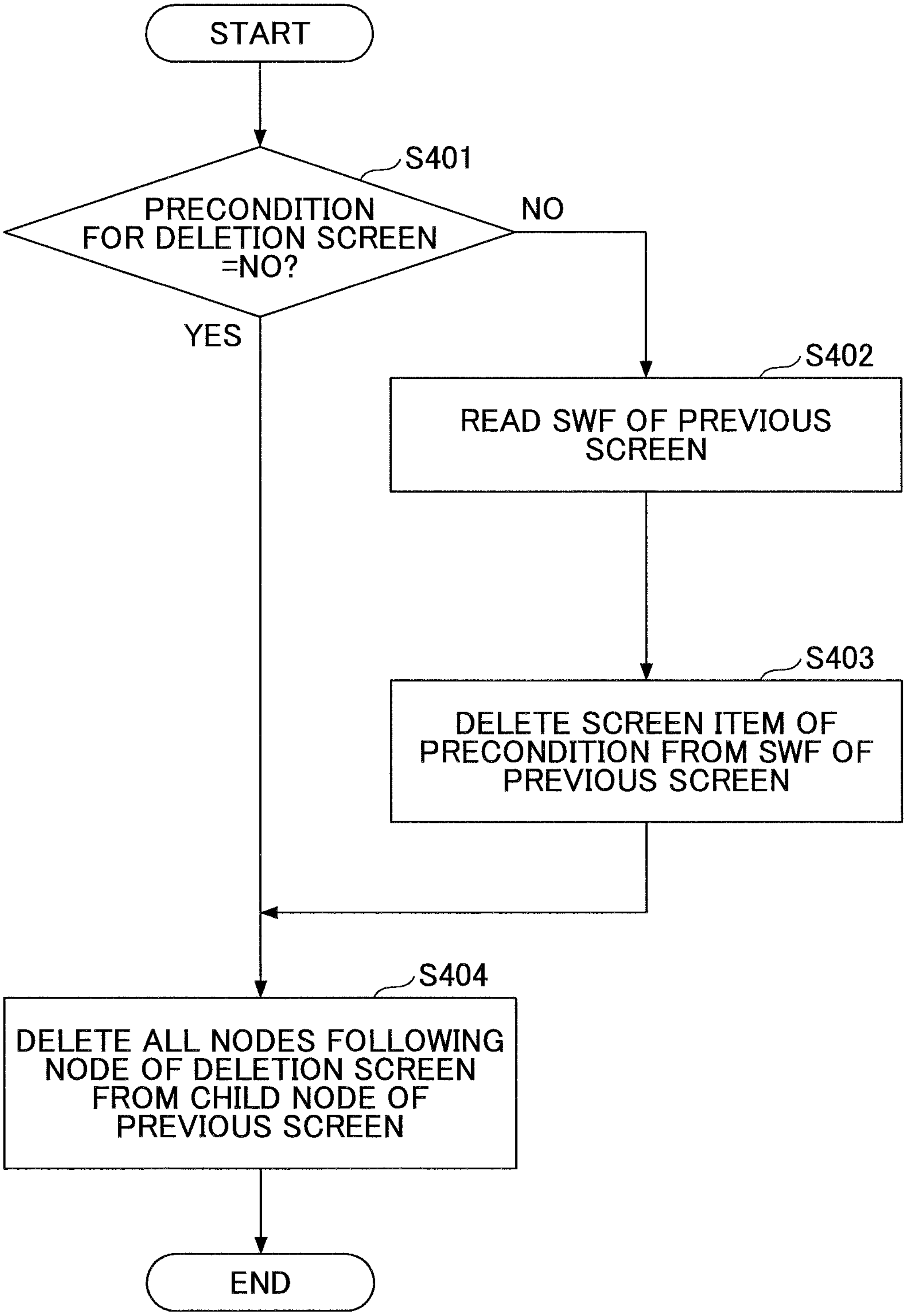
FIG. 31 is a flowchart illustrating a first process for preconditions at a time of deleting a screen of the embodiment.

FIG. 31 is a flowchart illustrating a first process for the preconditions at a time of deleting a screen of the embodiment. In step S401 illustrated in FIG. 31, the customization control unit 104 determines whether there are preconditions for the deletion screen. If there is no precondition in YES of step S401, the process goes to step S404. If there is a precondition in NO of step S401, the process goes to step S402.

In step S402, the customization control unit 104 reads the SWF file of the previous screen based on the screen transition information.

In step S403, the customization control unit 104 deletes a screen item indicated by the precondition of the deletion screen from the SWF file for the previous screen. This is because the screen item may not exist after deleting the screen. After finishing step S403, the process goes to step S404.

In step S404, the customization control unit 104 deletes the deletion screen and all nodes following the deletion node from the child node of the previous screen.

Figure 32A:
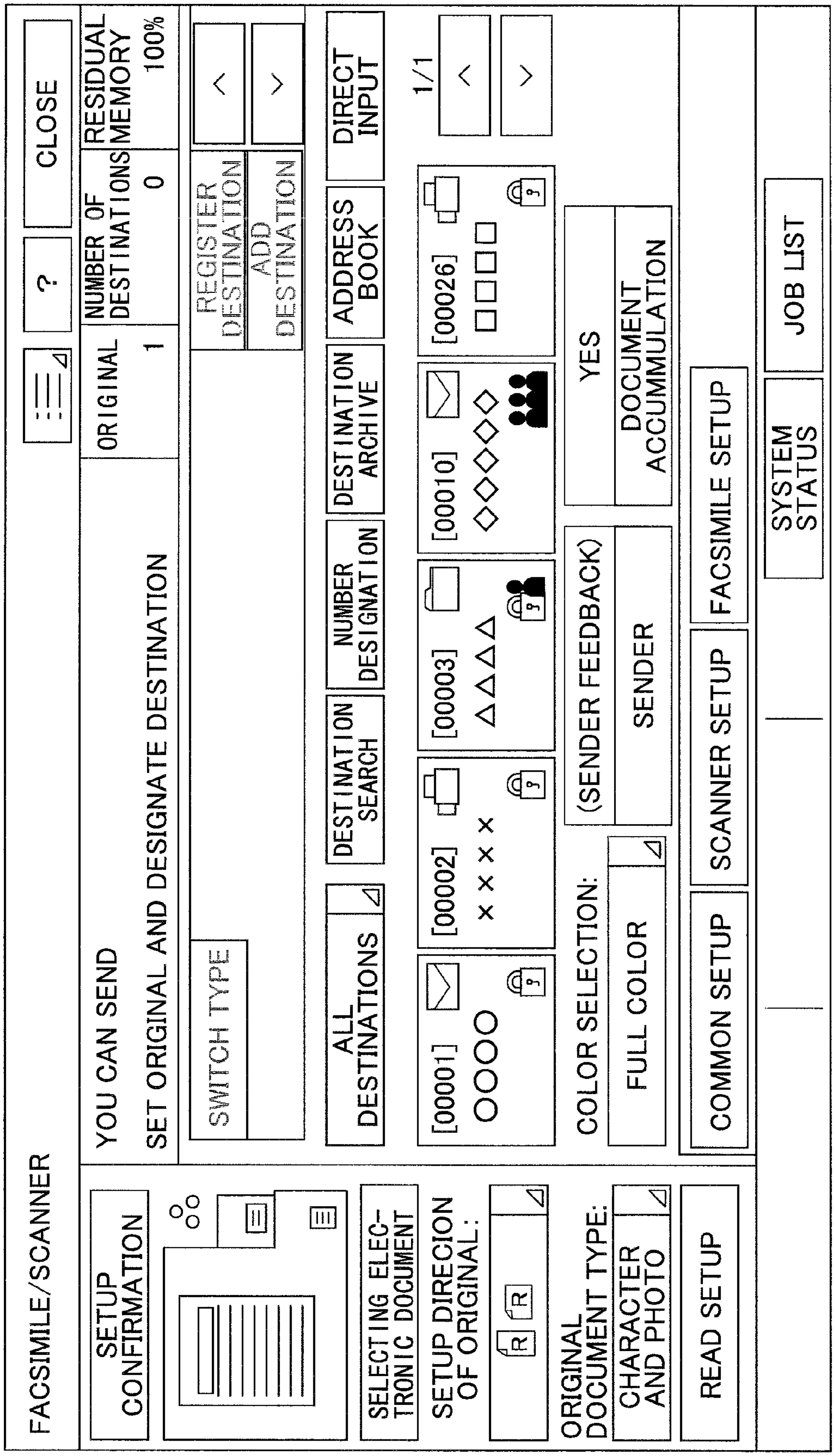
FIG. 32A and FIG. 32B illustrate deletion of the screen item.
Figure 32B:
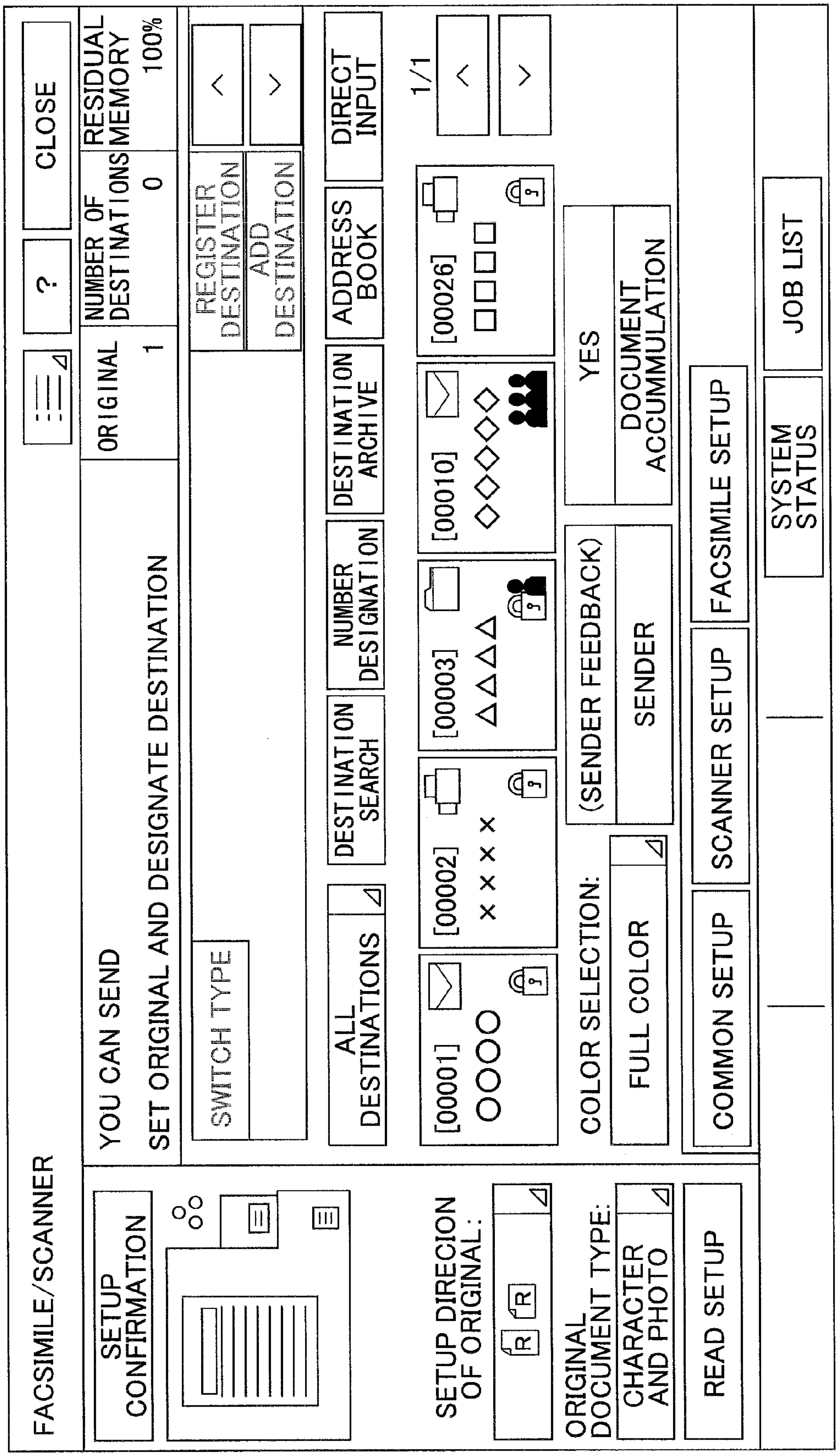

FIG. 32A and FIG. 32B illustrate the deletion of the screen item. FIG. 32A illustrates a scanner or facsimile top screen before removing the screen item. FIG. 32B illustrates a scanner or facsimile top screen after removing the screen item. Referring to FIG. 32B, the "electronic document selecting button" is deleted in step S403.

With this, if there is a screen item to be deleted from the previous screen, the screen item may be automatically deleted from the previous screen.

The customization control unit 104 updates the screen transition information by the process illustrated in FIG. 31. FIG. 33 illustrates an example of the fourth updated screen transition information. In the example illustrated in FIG. 33, the customization control unit 104 deletes layout nodes of the "electronic document selecting screen" to be deleted and the following screens from the screen transition information. For example, the layout nodes a13 and a131 to a133 illustrated in FIG. 6 are deleted from the screen transition information illustrated in FIG. 33.

If the display screen control unit 106 acquires the updated screen transition information, the display screen control unit 106 requests the display unit 108 to generate the customizing operation screen based on the updated screen transition information for the display unit 108.

Referring to FIG. 28, the display unit 108 generates the customizing operation screen based on the updated screen transition information and displays the generated customizing operation screen. With this, the customization of the screen transition can be easily done and the screen items to be deleted can be automatically deleted using the deletion screen.

(Deletion 2 of the Electronic Document Selecting Screen)

Figure 34:
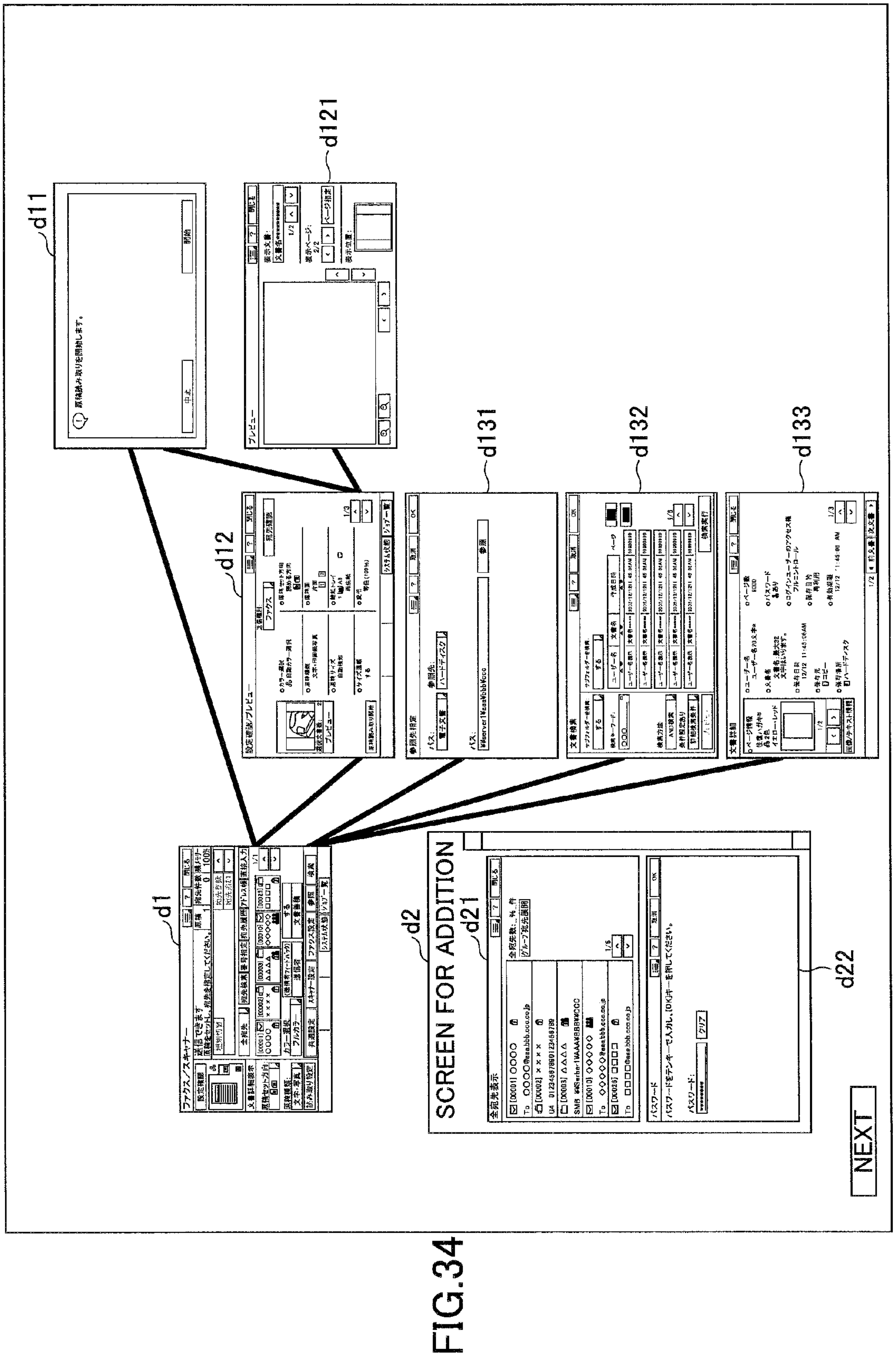
FIG. 34 illustrates a fifth customizing example of the embodiment.

FIG. 34 illustrates a fifth customizing example of the embodiment. In the example illustrated in FIG. 34, the user deletes the "electronic document selecting screen" d13 from the customizing operation screen. In the example, an example of deleting only the screen to be deleted is described. The processes of the deletion 2 to be described below and the deletion 1 described above may be appropriately selected by the user so as to be performed. The operations input unit 107 detects the operation and reports the contents of the customizing operation to the display screen control unit 106.

At this time, the operations input unit 107 also reports the deletion screen information to show which screen is deleted. The deletion screen information is the same as that illustrated in FIG. 29 and an explanation of that is omitted.

When the customization control unit 104 acquires the deletion screen information from the display screen control unit 106, the preconditions and the postconditions of the deletion screen are confirmed by referring to the conditional information (see FIG. 5). The customization control unit 104 acquires the preconditions of the deletion screen, the postconditions, the preconditions of the screen of the postconditions, and the postconditions from the conditional information.

FIG. 35 illustrates examples of the preconditions and the postconditions of the deletion screen and the screen of the postconditions. Referring to FIG. 35, the precondition of the screen items among the preconditions of the "electronic document selecting screen" is the "electronic document selecting button". The postcondition of the screen items among the postconditions of the "electronic document selecting screen" are the "reference source designating screen", the "search screen" and the "detailed document display screen".

The precondition of the "destination archive screen" is the "destination archive button". The precondition of the "reference source designating screen" is the "reference button". The precondition of the "detailed document display screen" is the "detailed document display button". The preconditions and the postconditions of the other information are entirely "NON". With this, the customization control unit 104 can determine that the "electronic document selecting button" may not be provided on a screen prior to the electronic document selecting screen.

The customization control unit 104 can determine that the "destination archive button", the "reference button" and the "detailed document display button" inside the "electronic document selecting screen" are to be used in the previous screen (scanner or facsimile top screen).

The customization control unit 104 controls to update the screen transition information stored in the memory unit 105 based on the confirmed preconditions and postconditions. At this time, the customization control unit 104 carries out a process related to the existing preconditions illustrated in FIG. 36.

Figure 36:
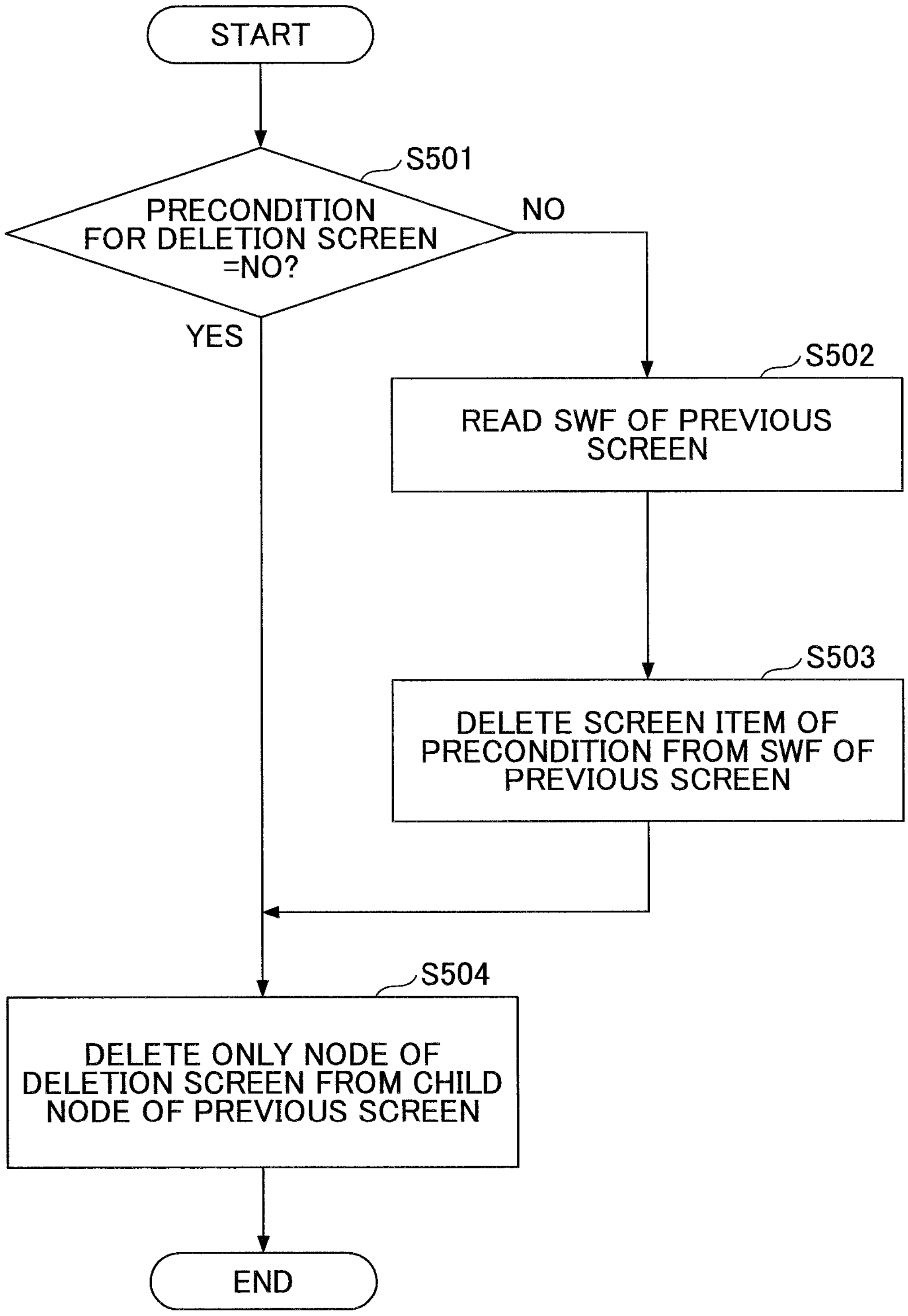
FIG. 36 is a flowchart illustrating a second process for preconditions at a time of deleting a screen of the embodiment.

FIG. 36 is a flowchart illustrating a second process for the preconditions at a time of deleting the screen of the embodiment. In step S501 illustrated in FIG. 36, the customization control unit 104 determines whether there are preconditions for the deletion screen. If there is no precondition in YES of step S501, the process goes to step S504. If there is a precondition in NO of step S501, the process goes to step S502.

In step S502, the customization control unit 104 reads the SWF file of the previous screen based on the screen transition information.

In step S503, the customization control unit 104 deletes a screen item indicated by the precondition of the deletion screen from the SWF file for the previous screen. This is because the screen item may not exist after deleting the screen. After finishing step S503, the process goes to step S504.

In step S504, the customization control unit 104 deletes only a node of the deletion screen from the child node of the previous screen.

Figure 37:
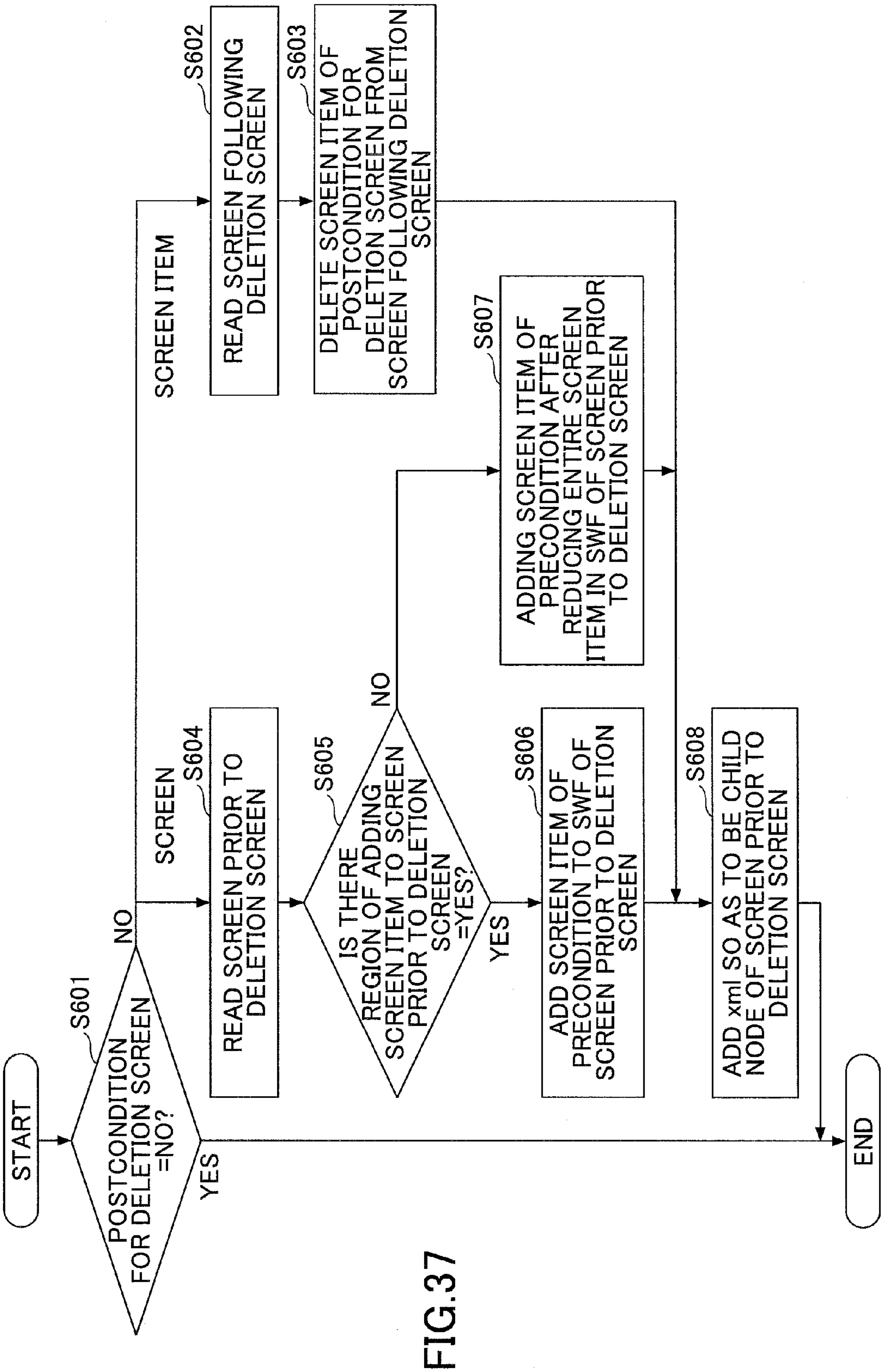
FIG. 37 is a flowchart illustrating an exemplary process for the postconditions at the time of deleting the screen of the embodiment.

FIG. 37 is a flowchart illustrating an exemplary process for the postconditions at the time of deleting the screen of the embodiment. In step S601 illustrated in FIG. 37, the customization control unit 104 determines whether there are postconditions for the deletion screen. If there is no postcondition in YES of step S601, the process ends. If the postcondition is the screen item, the process goes to step S602. If the postcondition is the screen, the process goes to step S604.

In step S602, the customization control unit 104 reads the SWF file of the screen following the deletion screen.

In step S603, the customization control unit 104 deletes a screen item being the postcondition of the deletion screen following the deletion screen.

In step S604, the customization control unit 104 reads the SWF file of the screen prior to the deletion screen.

In step S605, the customization control unit 104 determines whether the screen prior to the deletion screen has a region of accommodating a screen item being the precondition of the screen (e.g., the destination archive screen) being the postcondition. If there is the region in YES of step S605, the process goes to step S606. If there is no region in NO of step S605, the process goes to step S607.

In step S606, the customization control unit 104 adds the screen item being the precondition of the screen being the postcondition to the SWF file of the screen prior to the deletion screen.

In step S607, the customization control unit 104 reduces the size of the screen item in the SWF file of the screen prior to the deletion screen and adds the screen item being the precondition of the screen being the postcondition. Instead of the reduction of the screen item, a space for the screen item may be obtained by a change of the arrangement of the screen items or the like.

In step S608, the customization control unit 104 overwrites XML program code so that the node of the screen being the postcondition becomes a child node of the screen prior to the deletion screen.

Figure 38A:
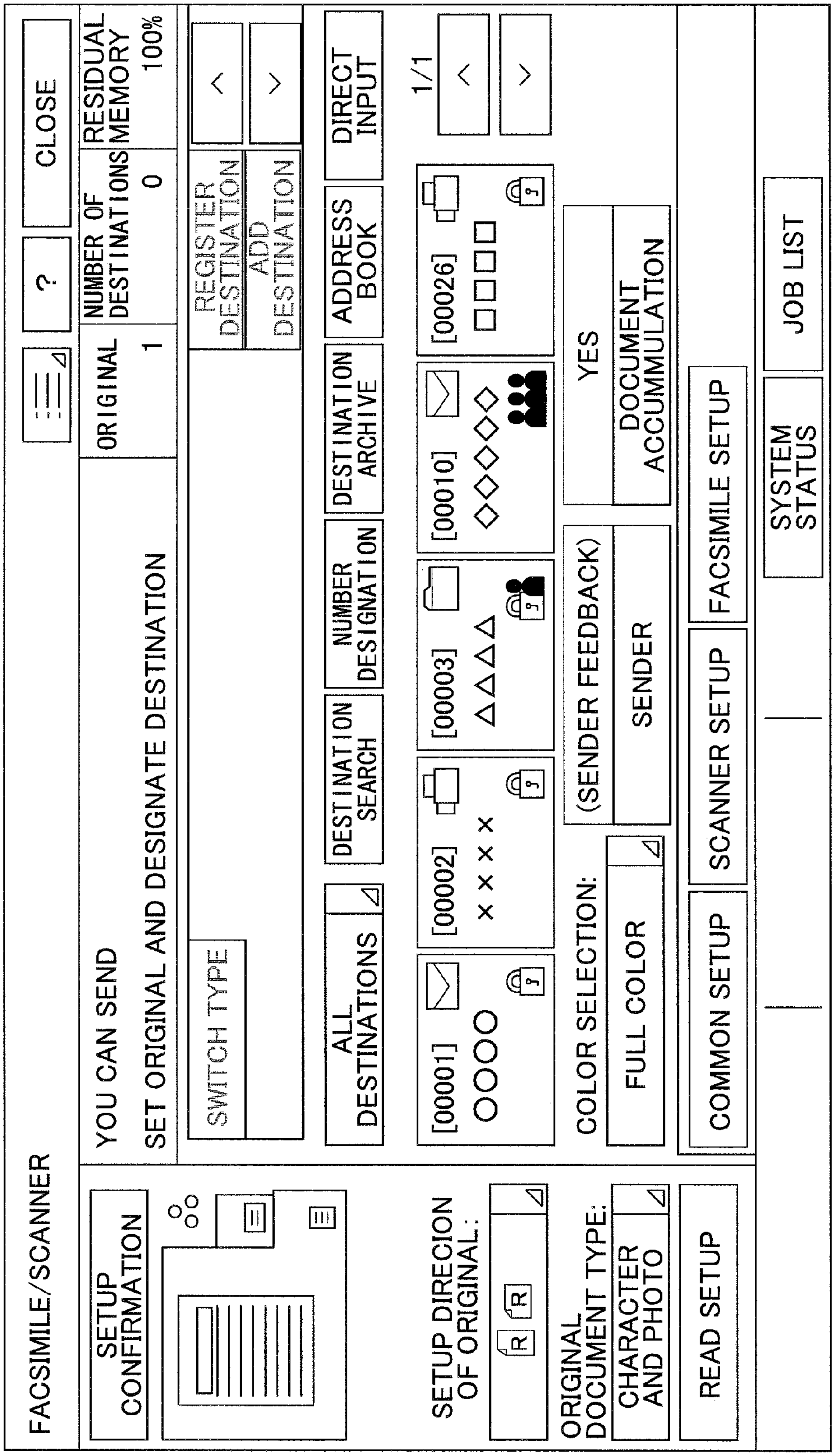
FIG. 38A and FIG. 38B illustrate addition of the screen item.
Figure 38B:
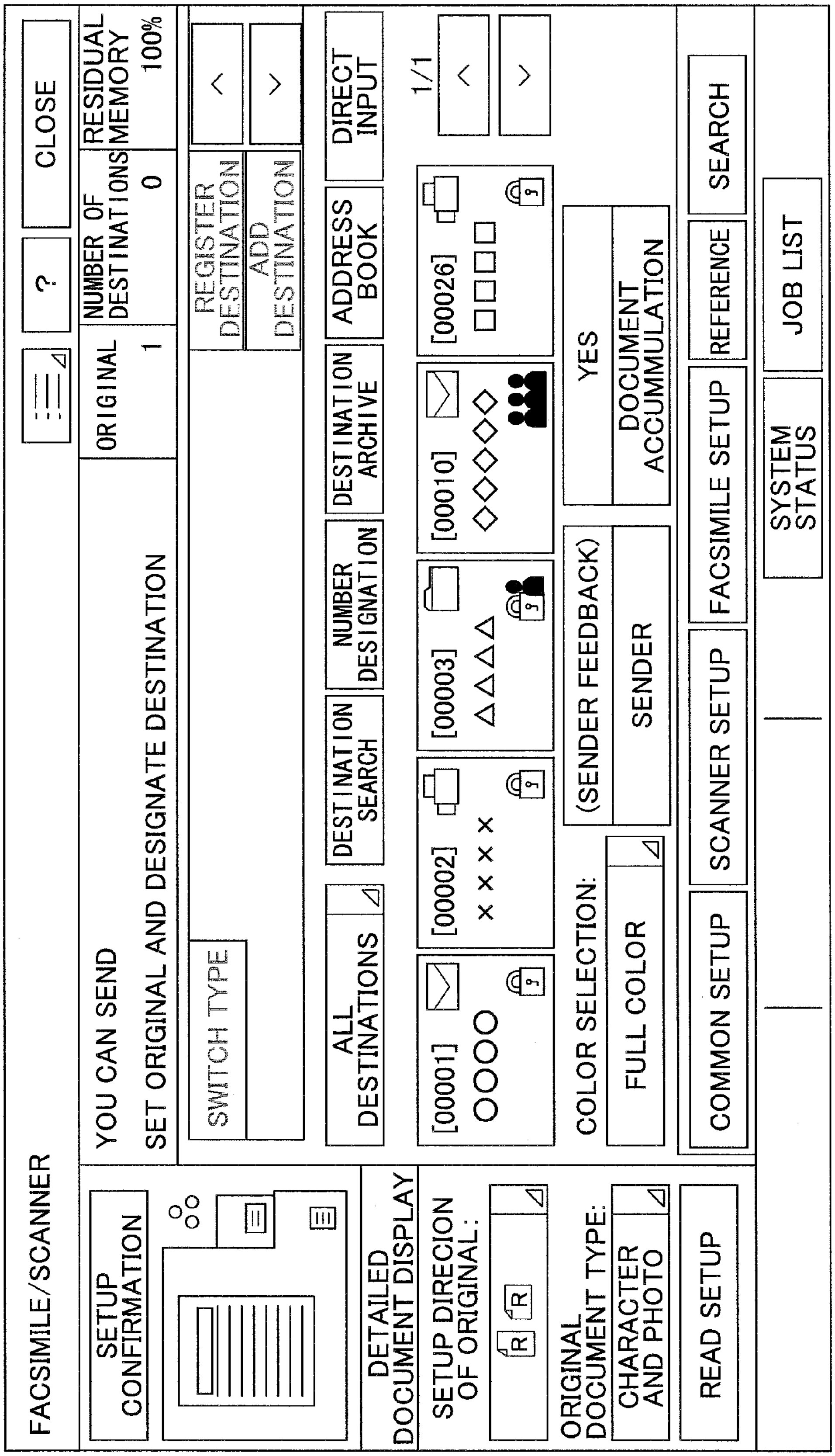

FIG. 38A and FIG. 38B illustrate the deletion of the screen item. FIG. 38B illustrates a scanner/facsimile top screen before adding a screen item. FIG. 38B illustrates a scanner/facsimile top screen after adding the screen item. The "detailed document display button", the "reference button" and the "search button" are added by processes in steps S606 and S607 illustrated in FIG. 37.

With this, if there is a screen item to perform a screen transition on the screen to be deleted, the screen item may be added to the screen prior to the deletion of the screen.

The customization control unit 104 updates the screen transition information by the process illustrated in FIG. 35 and FIG. 36. FIG. 39 illustrates an example of the fifth updated screen transition information. In the example illustrated in FIG. 37, the customization control unit 104 deletes only the layout node of the "electronic document selecting screen" to be deleted from the screen transition information. The customization control unit 104 changes the nodes of the deletion screen and screens following the deletion screen to be a child node of the screen prior to the deletion screen. For example, the layout node a13 illustrated in FIG. 6 is deleted and overwritten by the layout nodes a131 to a133 to be a child node of the screen transition information illustrated in FIG. 39.

If the display screen control unit 106 acquires the updated screen transition information, the display screen control unit 106 requests the display unit 108 to generate the customizing operation screen based on the updated screen transition information for the display unit 108.

Referring to FIG. 34, the display unit 108 generates the customizing operation screen based on the updated screen transition information and displays the generated customizing operation screen. With this, the customization of the screen transition can be easily done and the screen items can be automatically added using the deletion screen.

(Substitution of Screens)

If the screen is replaced as an example of the customization, the screen is deleted as described above and the other screen is added as described above. Therefore, if the screen is replaced, the above processes may be combined. Therefore, an explanation of this is omitted.

Therefore, according to the embodiment, the screen transition is displayed with a hierarchical structure. Even if the screen transition is frequently customized, the user can freely customize the screen transition.

Modified Example

Next, the information processing apparatus 1 of a modified example is described. The information processing apparatus of the modified example processes the above customization by operating a customizing tool.

<Function>

Figure 40:
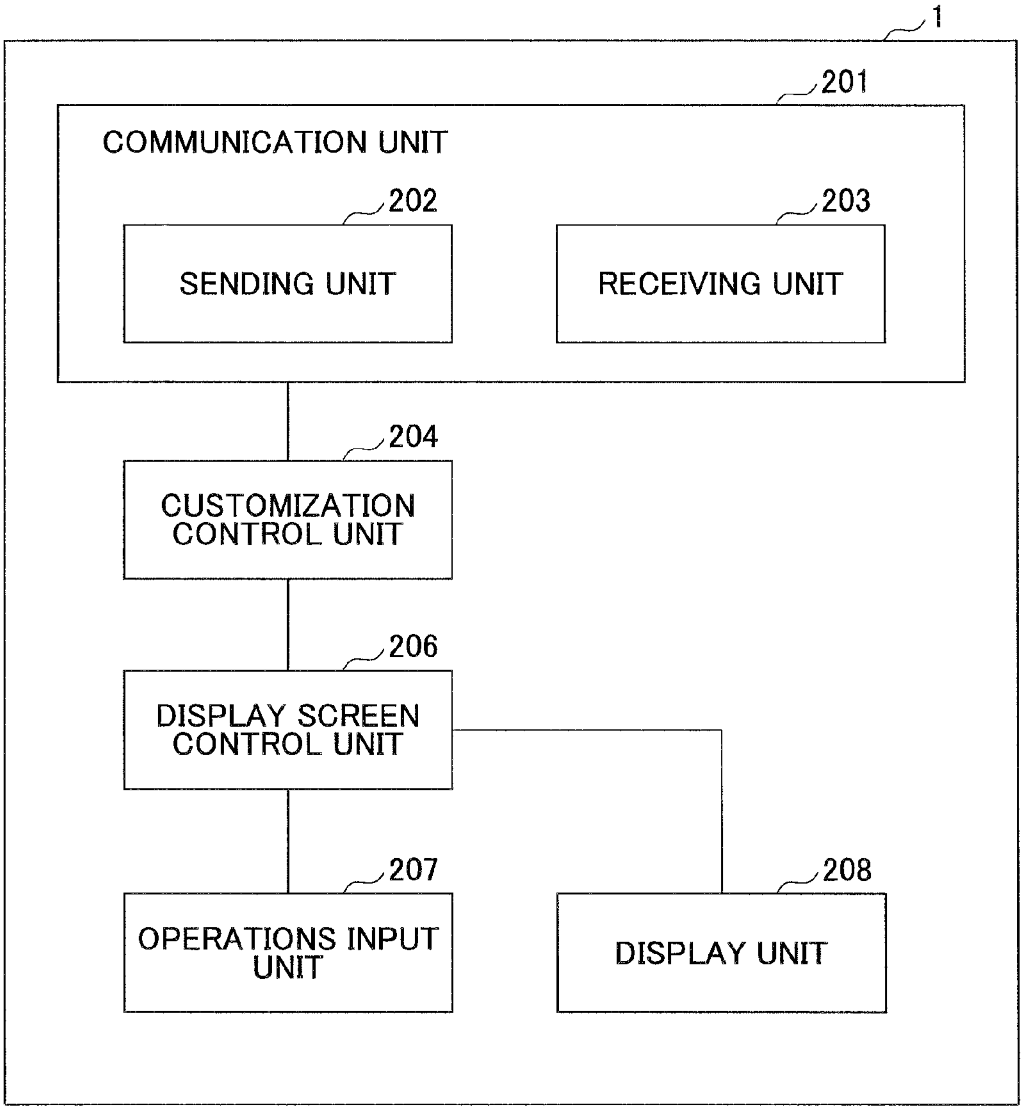
FIG. 40 is a block chart illustrating an example of functions of an information processing apparatus of a modified example.

FIG. 40 is a block chart illustrating a functional example of a function of the information processing apparatus 1 of the modified example. The information processing apparatus 1 illustrated in FIG. 40 includes a communication unit 201, a customization control unit 204, a display screen control unit 206, an operations input unit 207 and a display unit 208.

The customization control unit 204 acquires the screen transition information and the conditional information from the MFP 5 or the server 2. The customization control unit 204 performs the customization control as described above and sends the updated screen transition information to the MFP 5 via the communication unit 201. The other components are similar to those of MFP 5, and description of these is omitted. With this, it is possible to customize the screen transition information by the information processing apparatus 1 and send the updated screen transition information to the MFP 5.

A program executed by the MFP 5 or the image processing apparatus 1 of the modified example may be provided by a computer readable recording medium such as a CD-ROM, a flexible disk (FD), a CD-R, or a Digital Versatile Disk (DVD) storing a file which can be installed in or executed by a computer.

The program executed by the MFP 5 or the image processing apparatus 1 of the modified example may be stored in a computer connected to a network such as the Internet and enabled to be installed by downloading via the network. The program executed by the MFP 5 or the image processing apparatus 1 of the modified example may be provided or delivered via a network such as the Internet.

The program executed by the MFP 5 or the image processing apparatus 1 of the modified example may be provided by previously installing it in a ROM or the like.

The program executed by the MFP 5 or the image processing apparatus 1 of the modified example has a modular structure including the above described parts. As actual hardware, when a CPU (a processor) reads the program from the auxiliary memory unit and executes the read program, one or plural parts may be loaded in the main memory unit and the one or plural parts may be generated in the main memory unit.

Further, it is possible to form the information processing apparatus by combining all or parts of constituent elements of the embodiment.

With the embodiment, since the screen transition is displayed with a hierarchical structure, even if the screen transition is frequently customized, the user can freely customize the screen transition.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention.

Although the embodiment of the present invention has been described in detail, it should be understood that various changes, substitutions, and alterations could be made thereto without departing from the spirit and scope of the invention.

This patent application is based on Japanese Priority Patent Application No. 2010-276811 filed on Dec. 13, 2010, the entire contents of which are hereby incorporated herein by reference.

What is claimed is:

1. An image forming apparatus comprising:

a display unit that displays information;

a memory unit that stores a plurality of screens each including at least one UI component, screen transition information indicative of a relationship of screen transitions between the plurality of screens, and conditional information indicative of the UI component used to transit to each of the plurality of screens;

a display control unit that causes the plurality of screens and lines connecting the plurality of screens for indicating the relationship of the screen transitions for each of the plurality of screens stored in the memory unit to be displayed based on the screen transition information stored in the memory unit;

a receiving unit that receives an addition of an additional relationship of the screen transitions of transiting from a first screen included in the plurality of screens to a second screen included in the plurality of screens; and a changing unit that adds the UI component for transiting to the second screen to the first screen based on the conditional information of the second screen, wherein the receiving unit receives a deletion of the relationship of the screen transitions of transiting from the first screen included in the plurality of screens to the second screen included in the plurality of screens, wherein the changing unit deletes the UI component for transiting to the second screen from the first screen based on the conditional information of the second screen, wherein the changing unit adds the UI component for transiting to a third screen included in the plurality of screens to the first screen if the second screen includes the UI component for transiting to the third screen.

2. The image forming apparatus according to claim 1, wherein the changing unit adds the UI component for transiting to the second screen to the first screen after changing a size of the at least one UI component included in the first screen if there is no area on the first screen for adding the UI component for transiting to the second screen.

3. The image forming apparatus according to claim 1, wherein the changing unit adds the UI component for transiting to the third screen to the first screen after changing a size of the at least one UI component included in the first screen if there is no area on the first screen for adding the UI component for transiting to the third screen.

4. The image forming apparatus according to claim 1, wherein the display control unit causes the plurality of screens and lines connecting the plurality of screens for indicating the relationship of the screen transitions for each of the plurality of screens stored in the memory unit to be simultaneously displayed on a display of the display unit based on the screen transition information stored in the memory unit.

5. An information processing method comprising:

displaying, by a display unit, information;

storing, by a memory unit, a plurality of screens each including at least one UI component, screen transition information indicative of a relationship of screen transitions between the plurality of screens, and conditional information indicative of the UI component used to transit to each of the plurality of screens;

causing, by a display control unit, the plurality of screens and lines connecting the plurality of screens for indicating the relationship of the screen transitions for each of the plurality of screens stored in the memory unit to be displayed based on the screen transition information stored in the memory unit;

receiving, by a receiving unit, an addition of an additional relationship of the screen transitions of transiting from a first screen included in the plurality of screens to a second screen included in the plurality of screens; and adding, by a changing unit, the UI component for transiting to the second screen to the first screen based on the conditional information of the second screen, wherein the receiving receives a deletion of the relationship of the screen transitions of transiting from the first screen included in the plurality of screens to the second screen included in the plurality of screens, wherein the changing deletes the UI component for transiting to the second screen from the first screen based on the conditional information of the second screen, wherein the changing adds the UI component for transiting to a third screen included in the plurality of screens to the first screen if the second screen includes the UI component for transiting to the third screen.

6. The information processing method according to claim 5, wherein the causing causes, by the display control unit, the plurality of screens and lines connecting the plurality of screens for indicating the relationship of the screen transitions for each of the plurality of screens stored in the memory unit to be simultaneously displayed on a display of the display unit based on the screen transition information stored in the memory unit.

7. A computer-readable, non-transitory recording medium storing programs representing a sequence of instructions, the programs which when executed by a computer causing the computer to function as an image forming apparatus comprising:

a display unit that displays information;

a memory unit that stores a plurality of screens each including at least one UI component, screen transition information indicative of a relationship of screen transitions between the plurality of screens, and conditional information indicative of the UI component used to transit to each of the plurality of screens;

a display control unit that causes the plurality of screens and lines connecting the plurality of screens for indicating the relationship of the screen transitions for each of the plurality of screens stored in the memory unit to be displayed based on the screen transition information stored in the memory unit;

a receiving unit that receives an addition of an additional relationship of the screen transitions of transiting from a first screen included in the plurality of screens to a second screen included in the plurality of screens; and a changing unit that adds the UI component for transiting to the second screen to the first screen based on the conditional information of the second screen, wherein the receiving unit receives a deletion of the relationship of the screen transitions of transiting from the first screen included in the plurality of screens to the second screen included in the plurality of screens, wherein the changing unit deletes the UI component for transiting to the second screen from the first screen based on the conditional information of the second screen, wherein the changing unit adds the UI component for transiting to a third screen included in the plurality of screens to the first screen if the second screen includes the UI component for transiting to the third screen.

8. The computer-readable, non-transitory recording medium according to claim 7, wherein the display control unit causes the plurality of screens and lines connecting the plurality of screens for indicating the relationship of the screen transitions for each of the plurality of screens stored in the memory unit to be simultaneously displayed on a display of the display unit based on the screen transition information stored in the memory unit.

* * * * *